US009283945B1

United States Patent
Kernwein et al.

(10) Patent No.: US 9,283,945 B1
(45) Date of Patent: Mar. 15, 2016

(54) BRAKING SYSTEMS AND METHODS OF DETERMINING A SAFETY FACTOR FOR A BRAKING MODEL FOR A TRAIN

(71) Applicant: WABTEC HOLDING CORP., Wilmerding, PA (US)

(72) Inventors: Jeffrey D. Kernwein, Cedar Rapids, IA (US); Dennis W. Sutherland, Marion, IA (US); Kristofer M. Ruhland, Cedar Rapids, IA (US); James A. Oswald, Coggon, IA (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 14/212,281

(22) Filed: Mar. 14, 2014

Related U.S. Application Data

(60) Provisional application No. 61/782,693, filed on Mar. 14, 2013.

(51) Int. Cl.
*B60T 8/18* (2006.01)
*B60T 17/22* (2006.01)

(52) U.S. Cl.
CPC .................................. *B60T 17/228* (2013.01)

(58) Field of Classification Search
CPC ..... B60L 2200/26; B60L 3/0076; B60T 8/18; B60T 8/1893; B60T 13/662; B60T 13/665; B60T 17/228
USPC .......... 701/19, 20, 36, 70, 408, 409; 303/121, 303/122, 128, 131, 132, 192, 198; 246/167 R, 182 R, 182 A, 182 B, 183, 246/184
See application file for complete search history.

(56) References Cited

U.S. PATENT DOCUMENTS

| | | |
|---|---|---|
| 3,731,193 A | 5/1973 | Darrow |
| 3,921,946 A | 11/1975 | Norton et al. |
| 4,005,837 A | 2/1977 | Grundy |
| 4,005,838 A | 2/1977 | Grundy |
| 4,235,402 A | 11/1980 | Matty et al. |
| 4,384,695 A | 5/1983 | Nohmi et al. |
| 4,562,543 A | 12/1985 | Zuber et al. |
| 5,744,707 A | 4/1998 | Kull |
| 6,125,311 A * | 9/2000 | Lo ................................ 701/31.9 |
| 6,314,358 B1 | 11/2001 | Dorn et al. |
| 6,580,976 B1 * | 6/2003 | Belcea ............................ 701/20 |
| 7,092,801 B2 | 8/2006 | Kane et al. |
| 8,019,496 B2 | 9/2011 | Matusiak, Jr. et al. |
| 2004/0267415 A1 * | 12/2004 | Lacote et al. ................... 701/19 |
| 2007/0142984 A1 | 6/2007 | Plawecki et al. |
| 2008/0015764 A1 | 1/2008 | Watanabe |
| 2009/0125170 A1 | 5/2009 | Noffsinger et al. |
| 2011/0313671 A1 | 12/2011 | Nedilko et al. |
| 2014/0343767 A1 * | 11/2014 | Oswald et al. .................. 701/19 |

* cited by examiner

*Primary Examiner* — Thomas Tarcza
*Assistant Examiner* — Edward Pipala
(74) *Attorney, Agent, or Firm* — The Webb Law Firm

(57) ABSTRACT

Disclosed are a computer-implemented method for determining safety factors or a safety factor formula for use in a braking model of at least one train, a computer-implemented method for determining a plurality of safety factors for use in a braking model of at least one train, and braking systems for use on trains.

18 Claims, 15 Drawing Sheets

| | Nominal | Low | High | Method | Consist | Locomotive | Loaded Cars | Empty Cars |
|---|---|---|---|---|---|---|---|---|
| Loco Net Braking Ratio | 0.3 | 0.285 | 0.315 | | Count | 4 | 100 | 0 |
| Loaded Car Net Braking Ratio | 0.09 | 0.085 | 0.095 | | Weight (tons) | 207.5 | 143 | 31.25 |
| Loaded Car Weight | 143 | 142.285 | 143.715 | | Length (feet) | 74 | 59.01 | 59.01 |
| Empty Car Net Braking Ratio | 0.238 | 0.2261 | .2499 | | # Brakes | 4 | 100 | 0 |
| Empty Car Weight | 31.25 | | | | NBR | 0.3 | 0.09 | 0.238 |
| Car Length | 59.01 | | | | Total Weight (tons) | | | 15130 |
| Loco Length | 74 | | | | Total Length (feet) | | | 6197 |
| Loco Weight | 207.5 | | | | Compute Consist - Step 1 | | | |
| Penalty Delay (sec) | 0 | | | | Distributed Power fraction | .71 | Air Brake Propagation Seconds | |
| Ratio of Oper. Brake | 1 | .98 | 1.0 | | Supplied Brake Force | | Nominal Car Brake Force (lbs) | |
| Service Reduction (psi) | 25 | | | | 0 | | Nominal Loco Brake Force (lbs) | |
| Brake Setup Time (sec) | 11 | 10.5 | 11.5 | | Compute Brake Forces - Step 2 | Show Resistive Forces Form Step 3 | Show Forces Form - Step 4 | |
| Per car propagation | 0.013 | 0.012 | 0.014 | | | | | |

|  | Nominal | Low | High | Method |  |  |
|---|---|---|---|---|---|---|
| Friction Coef. 1 | 0.0092 | | | | Mass | |
| Friction Coef. 2 | 1.023 | | | | Stopping Distance (ft) | |
| Friction Coef. 3 | 0.0031 | | | | | |
| Friction Coef. 4 | 2.5 | | | | Stopping Time (sec) | |
| Friction Coef. 5 | 0.0833 | | | | Wabtec Safe Stopping Distance | |
| Initial Speed | 50 | 49.75 | 50.25 | | | |
| Average Grade | 0 | -0.1 | 0.1 | | | |
| Safety Offset Coef. a,b,c,d | 51.77647546 | 12.47080024 | 1.31e-03 | 0.824532819 | | |
| Safety Offset Coef. e,f,g,h | -1.933016115 | 181.0752021 | -0.042320324 | 8.81e-03 | | |
| Safety Offset Coef. i,j,k,l | -0.22262304 | -2.89e-04 | 1.90e-03 | 2.99e-04 | | |
| Safety Offset Coef. m | 1.808804724 | | | | | |
| Emergency Setup Start | 1000 | Prediction for Monte Carlo | | | | |
| Emergency Car Propagation | 0.00417 | MC minimum brake application time | | | Emergency Application Speed | 25 |
| Dynamic Brake Force Axles | | | | | | |

Regression Results

Equation:

| Fit Information | Data Table | Model Plot | Residual Scatter | Residual Probability | Evaluate |

| | | | | |
|---|---|---|---|---|
| DataFit version 9.0.59 | | | | |
| | | | | |
| Model Definition: | | | | |
| F1 = x2 | | | | |
| F2 = x3/300 | | | | |
| F3 = (x1 + 5) * 10 | | | | |
| F4 = (f1*a+b)* (c*f2+d) * (e*f3+f) | | | | |
| F5 = exp(g*f1+h*f2+i*f3+j*f1*f2+k*f1*f3+l*f2*f3+m) | | | | |
| Y = f4*f5 | | | | |
| | | | | |
| Number of observations = 275 | | | | |
| Number of missing observations = 0 | | | | |
| Solver type: Nonlinear | | | | |
| Nonlinear iteration limit = 500 | | | | |
| Diverging nonlinear iteration limit = 15 | | | | |
| Number of nonlinear iterations performed = 123 | | | | |
| Residual tolerance = 0.00000000001 | | | | |
| Sum of Residuals = 32950.6109034059 | | | | |
| Average Residual = 119.820403285112 | | | | |
| Residual Sum of Squares (Absolute) = 187986593.036737 | | | | |
| Residual Sum of Squares (Relative) = 3913575.6761484 | | | | |
| Standard Error of the Estimate = 122.218295443131 | | | | |
| Coefficient of Multiple Determination (R^2) = 0.8624900434 | | | | |
| Proportion of Variance Explained = 86.24900434% | | | | |
| Adjusted coefficient of multiple determination (Ra^2) = 0.8561918775 | | | | |
| Durbin-Watson statistic = 2.16016189341389 | | | | |

| Regression Variable Results | | | | |
|---|---|---|---|---|
| Variable | Value | Standard Error | t-ratio | Prob(t) |
| a | 44.9340328596427 | 46078891.5005003 | 9.751543797E-007 | 1.0 |
| b | 49.2406120998308 | 50495196.5717096 | 9.751543799E-007 | 1.0 |
| c | -4.46893316464077E-07 | 250.195902607788 | -1.786173602E-009 | 1.0 |
| d | 0.495962763497715 | 207954.363842069 | 2.384959634E-006 | 1.0 |
| e | -2.78189700895652E-05 | 15545.2955152585 | -1.789542699E-009 | 1.0 |
| f | 160.302837237955 | 136116635.01833 | 1.177687336E-006 | 1.0 |
| g | -4.10528447417003E-02 | 1.15555059061175E-02 | -3.55266529 | 0.00045 |
| h | 8.89648333781642E-03 | 504.581754193404 | 1.763140118E-005 | 0.99999 |
| i | -0.187420083281349 | 96.9706588318775 | -0.001932750437 | 0.99846 |
| j | -8.61033601234964E-05 | 1.3107785364336E-04 | -0.6568871684 | 0.51183 |
| k | 1.43036942374938E-03 | 1.30268926866629E-04 | 10.98012748 | 0.0 |
| l | -6.58956786519433E-06 | 2.90651201849421E-04 | -0.02267173789 | 0.98193 |
| m | 1.54710450392067 | 754549.072835556 | 2.050369631E-006 | 1.0 |

FIG. 14

Regression Results

Equation:
2: exp(a*x1+b*x2+c*x3+d)

| Fit Information | Data Table | Model Plot | Residual Scatter | Residual Probability | Evaluate |

| | | | | |
|---|---|---|---|---|
| DataFit version 9.0.59 | | | | |
| | | | | |
| Equation ID: = exp(a*x1+b*x2+c*x3+d) | | | | |
| Model Definition: | | | | |
| Y = exp(a*x1+b*x2+c*x3+d) | | | | |
| | | | | |
| Number of observations = 275 | | | | |
| Number of missing observations = 0 | | | | |
| Solver type: Nonlinear | | | | |
| Nonlinear iteration limit = 500 | | | | |
| Diverging nonlinear iteration limit = 15 | | | | |
| Number of nonlinear iterations performed = 13 | | | | |
| Residual tolerance = 0.00000000001 | | | | |
| Sum of Residuals = 53379.8498761359 | | | | |
| Average Residual = 194.108545004131 | | | | |
| Residual Sum of Squares (Absolute) = 351865651.562389 | | | | |
| Residual Sum of Squares (Relative) = 6339699.19198928 | | | | |
| Standard Error of the Estimate = 152.950070139507 | | | | |
| Coefficient of Multiple Determination (R^2) = 0.7772441795 | | | | |
| Proportion of Variance Explained = 77.72441795% | | | | |
| Adjusted coefficient of multiple determination (Ra^2) = 0.7747782479 | | | | |
| Durbin-Watson statistic = 1.89449121618198 | | | | |
| | | | | |
| Regression Variable Results | | | | |
| Variable | Value | Standard Error | t-ratio | Prob(t) |
| a | -.095256488666879 | 2.85178548878929E-02 | -33.40240318 | 0.0 |
| b | 3.20385944583004E-02 | 1.13835223606663E-03 | 28.14471079 | 0.0 |
| c | 2.78510996935352E-05 | 1.20700059563633E-05 | 2.307463625 | 0.02178 |
| d | 3.97873608515496 | 0.310875637611859 | 12.79848146 | 0.0 |

BRAKING SYSTEMS AND METHODS OF DETERMINING A SAFETY FACTOR FOR A BRAKING MODEL FOR A TRAIN

CROSS REFERENCE TO RELATED APPLICATIONS

This application claims benefit of priority from U.S. Provisional Patent Application No. 61/782,693, filed Mar. 14, 2013, which is incorporated herein by reference in its entirety.

BACKGROUND OF THE INVENTION

1. Field of the Invention

The present invention relates generally to train control and braking systems, and in particular to braking systems and methods of determining a safety factor for use in a braking model or algorithm on an operating train.

2. Description of the Related Art

As is known in the art, trains, which include at least one locomotive and, typically, multiple railcars, employ complex braking systems and arrangements for slow or stopping the train in variety of conditions and environments. For example, existing braking systems are shown and described in U.S. Publication No. 2007/0142984 and U.S. Pat. Nos. 8,019,496; 6,314,358; 5,744,707; 4,562,543; 4,384,695; 4,235,402; 4,005,838; 4,005,837; 3,921,946; and 3,731,193. Further, many train systems and networks use some form of computer-controlled train management system, such as a Positive Train Control (PTC) system (e.g., the I-ETMS® of Wabtec Corporation). These computer-controlled train management systems have on-board computers or controllers that are used to implement certain train control and management actions for ensuring safe and effective operation of the train.

In addition, the computerized braking control system of the train management system uses a braking model or algorithm to build or determine stopping distances as the train advanced through the train network. Such stopping distances are based upon certain specified train-based operating parameters and/or variable feedback from a number of sensor systems and ancillary determinations, e.g., track grade, track curvature, train speed, train weight, brake pipe pressure, braking system reservoir pressures, and the like. Accordingly, the braking model must account for those various parameters, but must also account for variation in the system parameters while providing a stopping distance that has a very low probability of stopping the train past the target location.

As is also known, these stopping distances are used to build a braking profile or curve that estimates or predicts when train will stop, such as at a specified target ahead on the track. This braking profile or curve is continually calculated using the braking model using the changing feedback and variable determinations to provide an updated braking profile or curve ahead of the train. In general, this braking profile or curve may be used to visually illustrate (e.g., to a train operator) where the train is predicted to stop if a full-service penalty brake application is initiated. Again, this braking profile or curve is continually (e.g., 1-3 times per second) updated so that the operator has an ongoing understanding of how and when the train would stop during a penalty brake situation, such as by displaying a predicted braking distance to the operator (e.g., a line on the operator's display that depicts the point where the train will come to a stop).

The braking model or algorithm is developed by executing a multitude of scenarios under a wide variety of conditions and variables related to all aspects of the train and its projected surrounding environment. Once a certain amount of data is collected however, it is recognized that some distributed variability exists for predicting the stopping distance. By varying certain parameters representing the train conditions and/or its environment, a normal distribution is developed. However, and based upon certain rules and/or standards, a safety factor is required to ensure to a specified probability that the required stopping distance will be safely short of the target. Historically, the stopping distance has been modeled as the combination of a nominal stopping distance for a full-service penalty brake application and the safety factor. Further, these existing safety factors are calculated based upon the train speed, and provides the addition to the nominal distance required to fall within the probability of stopping short of the target location. However, these existing speed-based safety factors lead to unreasonably large stopping distances with light trains or uphill grades. Therefore, there is a need in the art for an improved braking system and/or safety factor that minimizes the chance that the train will stop too great of a distance before the target location.

Still further, and during a penalty brake application, the braking model continues to monitor and predict the stopping distance, such as to a specified target location. In particular, this stopping distance would visually illustrate to the operator examining the in-cab display unit whether the train is predicted to stop before, at, or after the target location. While a prediction that the train will stop before or at the target location may not pose a significant safety issue, a predicted stop after the target location could prove problematic or unsafe. Therefore, there is a need in the art for an improved braking system that monitors and implements some action if it is predicted that the train will stop beyond the target location.

SUMMARY OF THE INVENTION

Generally, provided are improved braking systems and methods of determining a safety factor for a braking model for a train for use in train braking systems and computer-controlled train management systems. Preferably, provided are braking systems and methods of determining a safety factor for a braking model for a train that provide a more robust safety factor and/or formula for determining a safety factor that minimizes the chance the train will stop too short of the target location. Preferably, provided are braking systems that monitor and implement some action if the braking model or algorithm predicts that the train will stop beyond the target location.

Accordingly, and in one preferred and non-limiting embodiment, provided is a computer-implemented method for determining a safety factor formula for use in a braking model of at least one train. The method includes: (a) for a specified scenario having specified train modeling constants, providing the specified train modeling constants and a plurality of train data inputs into a braking model programmed to determine a predicted braking distance; (b) for a plurality of subsequent specified scenarios having the same specified train modeling constants, modifying a plurality of the train data inputs, and providing the specified train modeling constants and the modified train inputs into the braking model to determine a plurality of subsequent predicted braking distances; (c) determining at least one safety factor based at least in part on the distribution of the predicted braking distance and the subsequent predicted braking distances for the specified scenarios; (d) repeating steps (a)-(c) for a plurality of different specified scenarios; and (e) based at least partially on steps (a)-(d), determining a formula for, during train operation, calculating a safety factor based at least partially on (i) at least one operating train constant, and (ii) train speed, track grade, and train weight.

In another embodiment, the at least one operating train constant is at least one of the following: train type, train total tonnage, number of railcars, position of locomotive, availability of emergency braking, or any combination thereof. In another embodiment, the method further includes providing the formula to at least one on-board computer of at least one train for use in the calculation during train operation of at least one safety factor based at least partially on (i) at least one operating train constant, and (ii) train speed, track grade, and train weight. In a further embodiment, at least one of the specified train modeling constants is a parameter representing the use of emergency braking.

In another preferred and non-limiting embodiment, provided is a braking system for a train having at least one locomotive with at least one on-board computer and, optionally, at least one railcar, wherein the on-board computer is programmed, configured, or adapted to: receive a formula for, during train operation, calculating a safety factor based at least partially on (i) at least one operating train constant, and (ii) train speed, track grade, and train weight; receive or determine the at least one operating train constant; using the formula, calculate a safety factor based at least partially on (i) the at least one operating train constant, and (ii) train speed, track grade, and train weight; receive or determine a plurality of operational train data inputs; and determine at least one predicted braking distance using an on-board braking model and based at least partially on the plurality of operational train data inputs and the calculated safety factor.

In another embodiment, the operating train constants are at least one of the following: train type, train total tonnage, number of railcars, position of locomotive, availability of emergency braking, or any combination thereof. In another embodiment, the on-board computer is further programmed, configured, or adapted to: generate at least one braking profile or curve based at least partially on the at least one predicted braking distance; and display the at least one predicted braking distance on at least one display of the on-board computer. In a further embodiment, the use of an emergency braking system is selectable between at least one of the following conditions: (i) always use emergency braking for every braking event; (ii) only use emergency braking for a specified condition; (iii) only use emergency braking for an emergency braking event. In a still further embodiment, the on-board computer is further programmed, configured, or adapted to: initiate a penalty brake application; generate at least one emergency braking profile or curve based at least partially on the at least one predicted braking distance to a specified target location; update the at least one emergency braking profile or curve with a plurality of operational train data inputs, thereby providing at least one updated emergency braking profile or curve; and based upon at least one train condition, activate or cause the activation of an emergency braking system when the updated emergency braking profile or curve intersects the specified target location.

In a further preferred and non-limiting embodiment, provided is a braking system for a train having at least one locomotive with at least one on-board computer and, optionally, at least one railcar, wherein the on-board computer is programmed, configured, or adapted to: receive a database populated with a plurality of safety factors for a plurality of train speeds, track grades, and train weights; receive or determine at least one operating train constant; using the database, determine or select a safety factor based at least partially on (i) at least one operating train constant, and (ii) train speed, track grade, and train weight; receive or determine a plurality of operational train data inputs; and determine at least one predicted braking distance using an on-board braking model and based at least partially on the plurality of operational train data inputs and the determined safety factor.

In another embodiment, the at least one operating train constant is at least one of the following: train type, train total tonnage, number of railcars, position of locomotive, availability of emergency braking, or any combination thereof. In another embodiment, the on-board computer is further programmed, configured, or adapted to: generate at least one braking profile or curve based at least partially on the at least one predicted braking distance; and display the at least one predicted braking distance on at least one display of the on-board computer. In a further embodiment, the use of the emergency braking system is selectable between at least one of the following conditions: (i) always use emergency braking for every braking event; (ii) only use emergency braking for a specified condition; (iii) only use emergency braking for an emergency braking event. In a still further embodiment, the on-board computer is further programmed, configured, or adapted to: initiate a penalty brake application; generate at least one emergency braking profile or curve based at least partially on the at least one predicted braking distance to a specified target location; and update the at least one emergency braking profile or curve with a plurality of operational train data inputs, thereby providing at least one updated emergency braking profile or curve; activate or cause the activation of an emergency braking system when the updated emergency braking profile or curve intersects the specified target location.

In a further preferred and non-limiting embodiment, provided is a braking system for a train having at least one locomotive with at least one on-board computer and, optionally, at least one railcar, wherein the on-board computer is programmed, configured, or adapted to: determine at least one predicted braking distance using an on-board braking model; initiate a penalty brake application; generate at least one emergency braking profile or curve based at least partially on the at least one predicted braking distance to a specified target location; update the at least one emergency braking profile or curve with a plurality of operational train data inputs, thereby providing at least one updated emergency braking profile or curve; and based upon at least one train condition, activate or cause the activation of an emergency braking system when the updated emergency braking profile or curve intersects the specified target location. In another embodiment, the plurality of parameters comprises at least one of the following: operative brake ratio, freight empty car net braking ratio, freight loaded car net braking ratio, speed, grade, or any combination thereof.

In a still further preferred and non-limiting embodiment, provided is a computer-implemented method for determining a plurality of safety factors for use in a braking model of at least one train. The method includes: (a) for a specified scenario having specified train modeling constants, providing the specified train modeling constants and a plurality of train data inputs into a braking model programmed to determine a predicted braking distance; (b) for a plurality of subsequent specified scenarios having the same specified train modeling constants, modifying a plurality of the train data inputs, and providing the specified train modeling constants and the modified train inputs into the braking model to determine a plurality of subsequent predicted braking distances; (c) determining at least one safety factor based at least in part on the distribution of the predicted braking distance and the subsequent predicted braking distances for the specified scenarios;

(d) repeating steps (a)-(c) for a plurality of different specified scenarios; and (e) based at least partially on steps (a)-(d), generating a database populated with a plurality of safety factors selectable base at least partially on (i) at least one operating train constant, and (ii) train speed, track grade, and train weight.

In another embodiment, the at least one operating train constant is at least one of the following: train type, train total tonnage, number of railcars, position of locomotive, availability of emergency braking, or any combination thereof. In another embodiment, the method further includes providing the database to at least one on-board computer of at least one train for use in the selection, during train operation, of at least one safety factor based at least partially on (i) at least one operating train constant, and (ii) train speed, track grade, and train weight. In a further embodiment, at least one of the specified train modeling constants is a parameter representing the use of emergency braking.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 6 is a further exemplary screenshot of a data input and output form for the first step in a method and process for determining a braking algorithm or model and/or braking distances according to the principles of the present invention;

FIG. 7 is a still further exemplary screenshot of a data input and output form for the first step in a method and process for determining a braking algorithm or model and/or braking distances according to the principles of the present invention;

FIG. 9 is an exemplary screenshot of a data input and output form for a third step in a method and process for determining a braking algorithm or model and/or braking distances according to the principles of the present invention;

FIG. 10 is a further exemplary screenshot of a data input and output form for the third step in a method and process for determining a braking algorithm or model and/or braking distances according to the principles of the present invention;

FIG. 11 is another exemplary screenshot of a data input and output form for the third step in a method and process for determining a braking algorithm or model and/or braking distances according to the principles of the present invention;

FIG. 14 is an exemplary worksheet illustrating resulting curve fit data for a preferred embodiment of a safety factor determination formula according to the principles of the present invention;

FIG. 15 is an exemplary worksheet illustrating resulting curve fit data for another preferred embodiment of a safety factor determination formula according to the principles of the present invention;

DETAILED DESCRIPTION OF THE PREFERRED EMBODIMENTS

Figure 1:
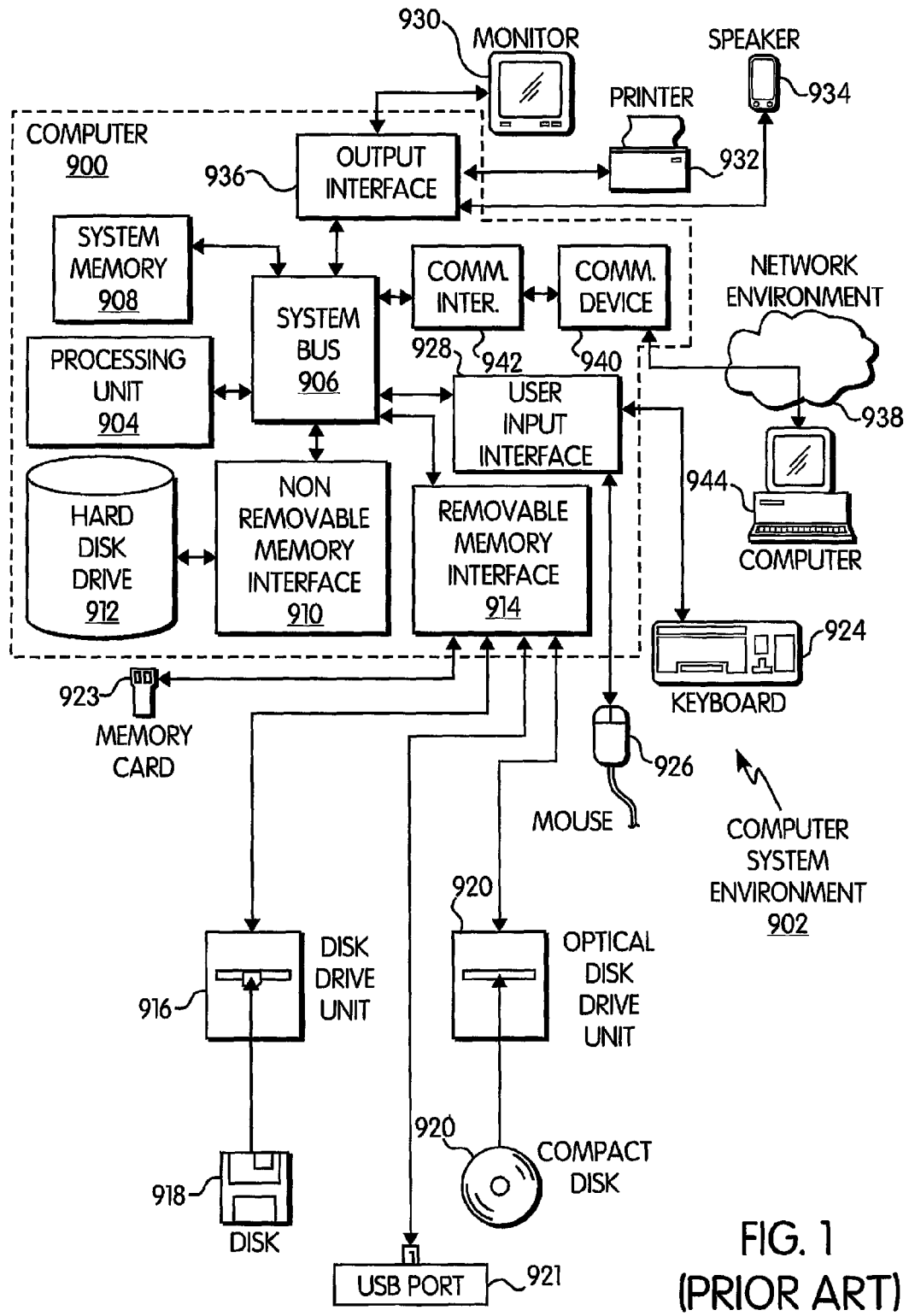
FIG. 1 is a schematic diagram of a computer and network infrastructure according to the prior art.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. Further, a variety of wired or wireless network devices may be used, including, but not limited to, a wireless network device, a wired network device, a WiFi network device, a Bluetooth network device, a Zigbee network device, a WirelessHART network device, a GPRS network device, an ultra-wideband network device, a cable network device, a wide-band network device, a multi-radio network device, and the like.

The present invention, including the various computer-implemented and/or computer-designed aspects and configures, may be implemented on a variety of computing devices and systems, including the client devices and/or server computer, wherein these computing devices include the appropriate processing mechanisms and computer-readable media for storing and executing computer-readable instructions, such as programming instructions, code, and the like. In addition, aspects of this invention may be implemented on existing controllers, control systems, and computers integrated or associated with, or positioned on, the locomotive and/or any of the railcars. For example, the presently-invented system or any of its functional components can be implemented wholly or partially on a train management computer, a Positive Train Control computer, an on-board controller or computer, a railcar computer, and the like. In addition, the presently-invented systems and methods may be implemented in a laboratory environment in one or more computers or servers. Still further, the functions and computer-implemented features of the present invention may be in the form of software, firmware, hardware, programmed control systems, microprocessors, and the like.

As shown in FIG. 1, and according to the prior art, personal computers 900, 944, in a computing system environment 902 may be provided or utilized. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc.

As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

As seen in FIG. 1, the computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data and other instruction-based computer-readable codes.

With continued reference to FIG. 1, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 1 provide storage of operating systems, computer-readable instructions, application programs, data structures, program modules, program data and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication with the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communication through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby, forming a specialized and particular computing system. Accordingly, the presently-invented method and system may include one or more computers 900 or similar computing devices having a computer-readable storage medium capable of storing computer-readable program code or instructions that cause the processing unit 902 to execute, configure or otherwise implement the methods, processes, and transformational data manipulations discussed hereinafter in connection with the present invention. Still further, the computer 900 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Figure 2:
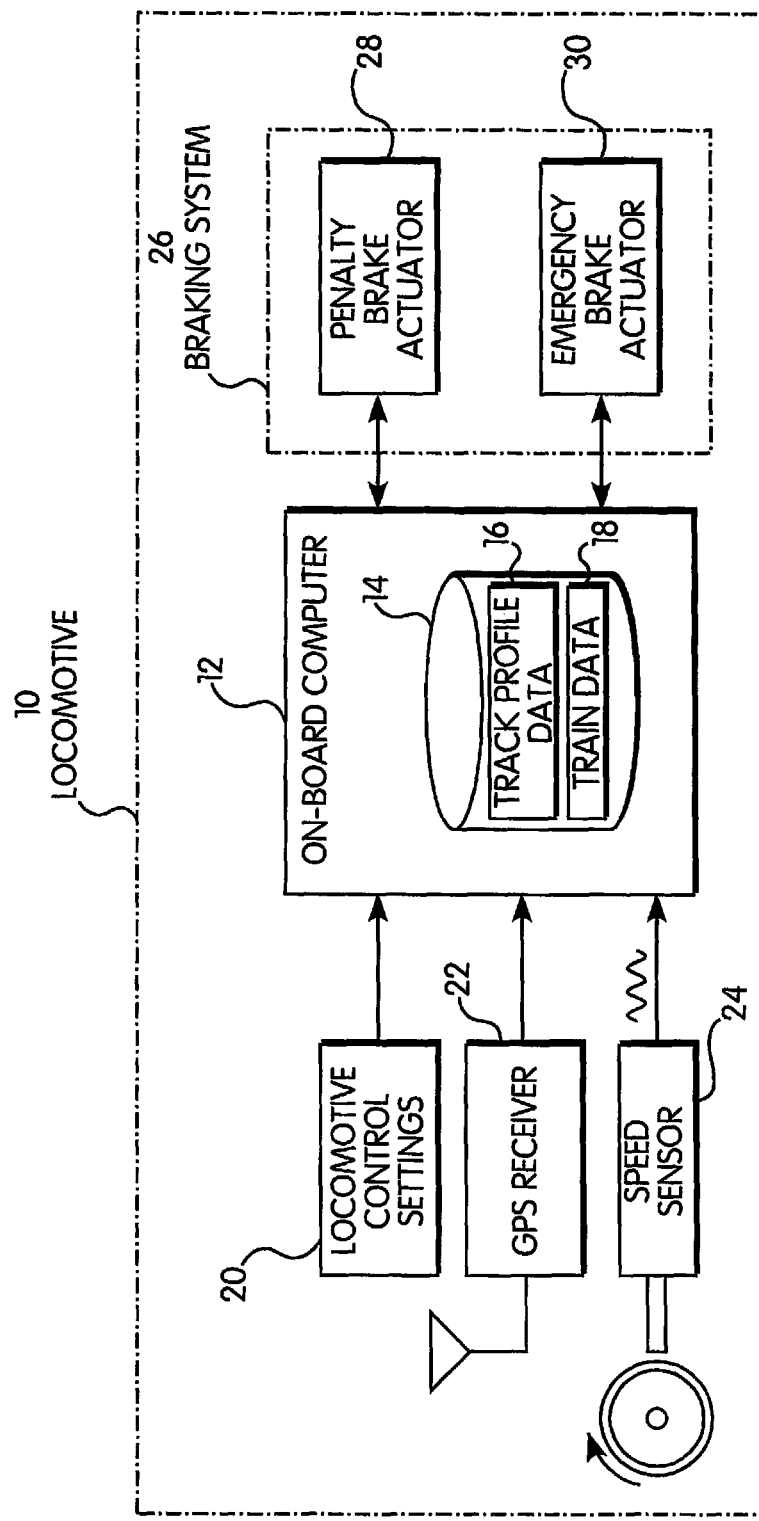
FIG. 2 is a schematic diagram of one embodiment of a train control and braking system according to the principles of the present invention.

The presently-invented system and methods can be implemented in connection with a variety of train types and railroad systems. In one preferred and non-limiting embodiment, and as illustrated in FIG. 2, the systems and methods described herein may be implemented on a train with at least one locomotive 10 having an on-board computer 12. The on-board computer 12 (or on-board controller, on-board computer system, train management computer, or the like) includes a database 14 populated with track profile data 16 and train data 18, and the on-board computer 12 also includes the appropriate braking model and other software or programs to effectively implement the systems and methods according to the present invention. In this embodiment, the on-board computer 12 receives real-time inputs from various locomotive control settings 20, a GPS receiver 22, and at least one speed sensor 24. As discussed in detail above and hereinafter, the on-board computer 12 is in communication with, integrated with, or controls the braking system 26, which includes a penalty brake actuator 28 and an emergency brake actuator 30. Accordingly, the presently-invented system and methods can be effectively implemented and used by or on such a locomotive 10 having such an on-board computer 12 and braking system 26. Of course, it is envisioned that any type of train management system and braking system and arrangement can be used within the context and scope of the present invention.

In one preferred and non-limiting embodiment, provided is a computer-implemented method for determining a safety factor formula for use in a braking model of at least one train. This method may be implemented on a computer system, whether on board the train, e.g., the locomotive 10 of the train, or in an off-site location, such as a laboratory or remote computer system. In this embodiment, and for a specified scenario having specified train modeling constants, the method includes (a) providing the specified train modeling constants and multiple train data inputs into a braking model programmed to determine a predicted braking distance. This braking distance may be the braking distance to a specified target location, the distance for the train to come to a stop from the current speed, and/or the distance at which the train will reach or drop below a target speed from the current speed. Next, and for multiple subsequent specified scenarios having the same specified train modeling constants, the method includes (b) modifying various, specified train data inputs, and providing the specified train modeling constants and the modified train inputs into the braking model to determine subsequent predicted braking distances. The method further includes (c) determining at least one safety factor based at least in part on the distribution of the predicted braking distance and the subsequent predicted braking distances for the specified scenarios, and (d) repeating steps (a)-(c) for multiple different specified scenarios. Finally, and based at least partially on steps (a)-(d), determining a formula for calculating a safety factor based at least partially on (i) at least one operating train constant, and (ii) train speed, track grade, and train weight. This formula may be used during train operation, where the train speed, track grade (optionally determined based upon train position), and train weight are input into the formula to determine or calculate the safety factor.

In another preferred and non-limiting embodiment, the operating train constant is at least one of the following: train type, train total tonnage, number of railcars, position of the locomotive 10, availability of emergency braking, or any combination thereof. In addition, at least one of the specified train modeling constants may be a parameter or value representing the use of emergency braking. In another preferred and non-limiting embodiment, and as discussed above, the method includes providing, distributing, or transmitting the formula to the on-board computer 12 on the locomotive 10 of the train for use in the calculation, during train operation, of at least one safety factor based at least partially on (i) at least one operating train constant, and (ii) train speed, track grade, and train weight.

In another preferred and non-limiting embodiment, provided is a braking system for a train having a locomotive 10 with an on-board controller or computer system 12 (or train management computer) and, optionally, at least one railcar. The on-board computer 12 is configured or programmed to: receive a formula for calculating, during train operation, a safety factor based at least partially on (i) at least one operating train constant, and (ii) train speed, track grade, and train weight; receive or determine the at least one operating train constant; using the formula, calculate a safety factor based at least partially on (i) the at least one operating train constant, and (ii) train speed, track grade, and train weight; receive or determine a various operational train data inputs; and determine at least one predicted braking distance using an on-board braking model and based at least partially on the operational train data inputs and the calculated safety factor. In one preferred and non-limiting embodiment, the operating train constants are at least one of the following: train type, train total tonnage, number of railcars, position of the locomotive 10, availability of emergency braking, or any combination thereof.

In another preferred and non-limiting embodiment, the on-board computer 12 is further configured or programmed to: generate at least one braking profile or curve based at least partially on the at least one predicted braking distance; and display the at least one predicted braking distance on a display of the on-board computer 12, such as on the interactive display device positioned in the cab of the locomotive 10. In addition, the use of the emergency braking system (e.g., an emergency braking sequence as initiated by the emergency brake actuator 30) is selectable between at least one of the following conditions: (i) always use emergency braking for every braking event; (ii) only use emergency braking for a specified condition; (iii) only use emergency braking for an emergency braking event. Still further, the on-board computer 12 may be further configured or programmed to: initiate a penalty brake application; generate at least one emergency braking profile or curve based at least partially on the at least one predicted braking distance to a specified target location (such as by using worst case values for multiple parameters and/or the same parameters used in determining a penalty curve); update the at least one emergency braking profile or curve with specified operational train data inputs (thereby providing at least one updated emergency braking profile or curve); and based upon at least one train condition, activate or cause the activation of the emergency braking system when the updated emergency braking profile or curve intersects the specified target location.

In a still further preferred and non-limiting embodiment, provided is a braking system for a train having at least one locomotive 10 with at least one on-board computer 12 and, optionally, at least one railcar. The on-board computer 12 is configured or programmed to: receive a database populated with multiple safety factors for specified train speeds, track grades, and train weights; receive or determine at least one operating train constant; using the database, determine or select a safety factor based at least partially on (i) at least one operating train constant, and (ii) train speed, track grade, and train weight; receive or determine multiple operational train data inputs; and determine at least one predicted braking distance using an on-board braking model and based at least partially on the operational train data inputs and the determined safety factor. As discussed above, the operating train constant is at least one of the following: train type, train total tonnage, number of railcars, position of the locomotive 10, availability of emergency braking, or any combination thereof.

In this preferred and non-limiting embodiment, the on-board computer 12 is further configured or programmed to: generate at least one braking profile or curve based at least partially on the at least one predicted braking distance; and display the at least one predicted braking distance on the display of the on-board computer 12 in the cab of the locomotive 10. In addition, the use of the emergency braking system is selectable between at least one of the following conditions: (i) always use emergency braking for every braking event; (ii) only use emergency braking for a specified condition; (iii) only use emergency braking for an emergency braking event. Further, the on-board computer 12 is configured or programmed to: initiate a penalty brake application; generate at least one emergency braking profile or curve based at least partially on the at least one predicted braking distance to a specified target location (such as by using worst case values for multiple parameters and/or the same parameters used in determining a penalty curve); update the at least one emergency braking profile or curve with multiple operational train data inputs (thereby providing at least one updated emergency braking profile or curve); and activate or cause the activation of an emergency braking system when the updated emergency braking profile or curve intersects the specified target location.

In a still further preferred and non-limiting embodiment, provided is a braking system for a train having at least one locomotive 10 with at least one on-board computer 12 and, optionally, at least one railcar, wherein the on-board computer 12 is configured or programmed to: determine at least one predicted braking distance using an on-board braking model; initiate a penalty brake application; generate at least one emergency braking profile or curve based at least partially on the at least one predicted braking distance to a specified target location (such as by using worst case values for multiple parameters and/or the same parameters used in determining a penalty curve); update the at least one emergency braking profile or curve with multiple operational train data inputs (thereby providing at least one updated emergency braking profile or curve); and based upon at least one train condition, activate or cause the activation of an emergency braking system when the updated emergency braking profile or curve intersects the specified target location. The parameters may be at least one of the following: operative brake ratio, freight empty car net braking ratio, freight loaded car net braking ratio, speed, grade, or any combination thereof.

In a still further preferred and non-limiting embodiment, provided is a computer-implemented method for determining multiple safety factors for use in a braking model of at least one train. The method includes: (a) for a specified scenario having specified train modeling constants, providing the specified train modeling constants and multiple train data inputs into a braking model programmed to determine a predicted braking distance; (b) for a plurality of subsequent specified scenarios having the same specified train modeling constants, modifying the train data inputs, and providing the specified train modeling constants and the modified train inputs into the braking model to determine a plurality of subsequent predicted braking distances; (c) determine at least one safety factor based at least in part on the distribution of the predicted braking distance and the subsequent predicted braking distances for the specified scenarios; (d) repeating steps (a)-(c) for a plurality of different specified scenarios; and (e) based at least partially on steps (a)-(d), generating a database populated with a plurality of safety factors selectable based at least partially on (i) at least one operating train constant, and (ii) train speed, track grade, and train weight. As discussed, the operating train constant may be at least one of the following: train type, train total tonnage, number of railcars, position of the locomotive 10, availability of emergency braking, or any combination thereof. In another preferred and non-limiting embodiment, the method includes providing the database to at least one on-board computer 12 of at least one train for use in the selection during train operation of at least one safety factor based at least partially on (i) at least one operating train constant, and (ii) train speed, track grade, and train weight. Further, at least one of the specified train modeling constants may be a parameter representing the use of emergency braking.

Figure 3:
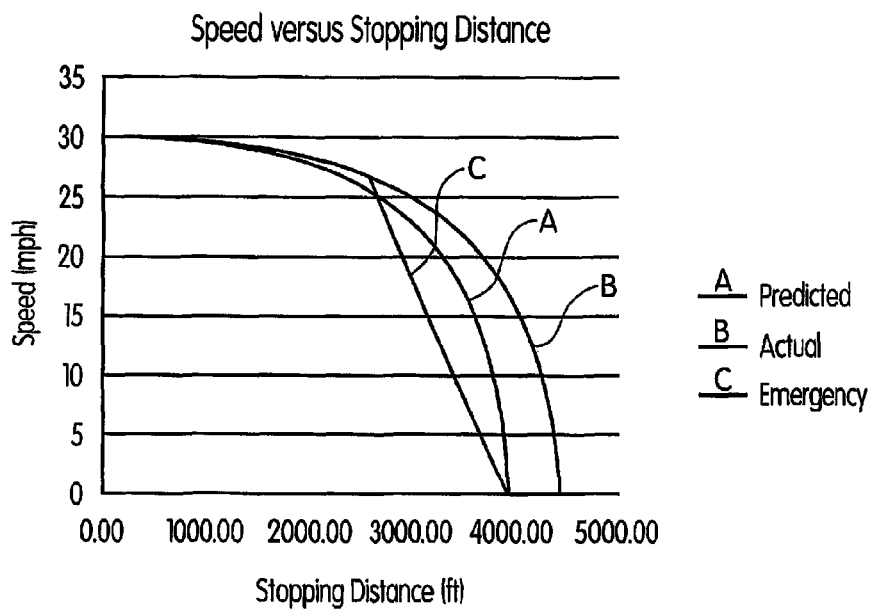
FIG. 3 is a graphical illustration of one exemplary embodiment of a predictive, an actual, and an emergency braking curve according to the principles of the present invention.

In one preferred and non-limiting embodiment, the braking formula or algorithm, which creates a braking curve under several different scenarios, is developed or implemented where, at the instant when a penalty brake application occurs, the method and process (whether on the on-board computer 12 or a remote computer) calculates a new braking curve (such as by using worst case values for multiple parameters and/or the same parameters used in determining a penalty curve). In the on-board computer 12, this prediction is updated with actual data during the penalty brake-induced stop, and when this new worst case curve intersects a target location, the emergency brakes are activated. With reference to FIG. 3, the braking curve, which may be graphically presented on the operator interface in the cab of the locomotive 10, includes a first curve (A) sliding to the right as the train approaches the target, and when the first curve (A) (which represents a full-service application) impinges upon the target, a full-service braking application is initiated in the braking system 26. In one example, one or more of the parameters of the determination may combine to indicate that the actual stop is going to be long compared to the predicted stopping distance (i.e., the second curve (B)). In this instance, and in this embodiment, when the actual stopping distance exceeds the predicted stopping distance of the curve, emergency braking is applied, as represented by the third curve (C).

As is known in probability theory and statistics, the variance of a random variable or distribution is the standard deviation of that variable from its expected value or mean, i.e., variance is the measure of the amount of variation of all the scores for a variable. In a braking distance prediction calculation, it would be preferable for the mean to be the target location, and the variance to be zero, where all stops would be exactly at the target location. However, in the existing braking algorithm or model, there exist more than 35 assumed constants and measured variables, each with a potential inaccuracy or measurement error. In probability theory, the central limit theorem (CLT) indicates conditions under which the mean of a sufficiently large number of independent random variables, each with a finite mean and variance, will be approximately normally distributed. For example, and with respect to railcar weight, an empty 100-ton capacity may weigh 35 tons. Contractual agreements between the buyer and seller may drive the load to a number near 100 tons. However, loader may put 99.8 tons of material in one car and 100.2 tons of material in the next, and the loader may load all cars somewhat "light", or all cars somewhat "heavy". Regardless, the consist weight for one hundred 100-ton cars will be given as 13,500 tons, such that the mean for trains of this consist is 13,500 tons and the variance is unknown. Accordingly, a reasonable estimate of the variance must be made. By using the above-discussed CLT method, the mean and the variance of the expected braking distance follows a normal distribution. Further, and since the braking distance has a normal distribution, the statistics for normal distributions can be applied and performance-based requirements can be generated.

In one preferred and non-limiting embodiment, the above-discussed means and variances are determined using a "Monte Carlo" process and analysis. In particular, and for each of the constants and measured values in the braking algorithm or model, a random number within the mean and variance for that value is selected, with the selected set referred to as a "trial" or "scenario". The braking distance for a large number of trials is calculated and a resulting mean and variance is recorded.

In one preferred and non-limiting embodiment, and in the design phase, the simulations assume a constant grade under and ahead of the train for the entire stop. However, in the actual on-board implementation (such as on the on-board computer system 12), every step in the numerical integration uses the actual grade to be covered in that step. Similarly, in the on-board implementation, the safety factor may be added incrementally as the curve is built. This allows one single curve to be used with both zero-speed speed targets and non-zero-speed speed targets. In one embodiment, it is recognized that an alert locomotive engineer will instinctively bail off independent brakes if an automatic full service brake application is applied, and the on-board computer 12 may assume that this will be the case if the number of cars is greater than 8. Whether the engineer does this or not influences the total length of the train stop, but has only a small influence on the variance of all stops conducted with this same assumption. Accordingly, in the design phase, the simulations used to calculate the variance in stopping distance may not include a bail off of the independent brake.

In one preferred and non-limiting embodiment, and in order to maintain as many constants as possible, the simulation retains the constants and assumed parameters from the current brake algorithm, with the following exceptions: (1) the freight brake valves are all of type ABD, ABDW, or ABDX; (2) the brake shoe/wheel rim coefficients are calculated as a function of speed; and (3) the train has a uniform mass distribution. In this preferred and non-limiting embodiment, the following parameters were varied in the simulation: Locomotive Net Braking Ratio, nominal +/−5%; Loaded Car Net Braking Ratio, nominal +/−5%; Loaded Car Weight, nominal +/−0.5%; Empty Car Net Braking Ratio, nominal +/−5%; Ratio of Operating Brakes, nominal +/−2%; Brake Setup Time, nominal +/−5%; Per Car Brake Pipe Propagation, nominal +/−7.5%; Initial Speed, nominal +/−0.25 mph; and Average grade under/ahead of train, nominal +/−0.1%.

The nominal grades used include: −2.15%, −2%, −2.5%, −2.0%, −0.5%, 0%, 0.5%, 1.0%, 1.5%, 2.0%, and 2.5%, the nominal speeds used include: 3 mph, 10 mph, 20 mph, 30 mph, 40 mph, 50 mph, and 60 mph, for Distributed Power trains, the weights include: 6,977 tons, 22,901 tons, and 27,495 tons, and the other train weights include: 3,321.25 tons and 12,621.25 tons. In this embodiment, the simulation is executed 1,000 times, and the simulations are executed for trains where the availability of emergency braking could not be confirmed and where emergency braking could be confirmed, resulting in a total of 385,000 trial runs.

Figure 4:
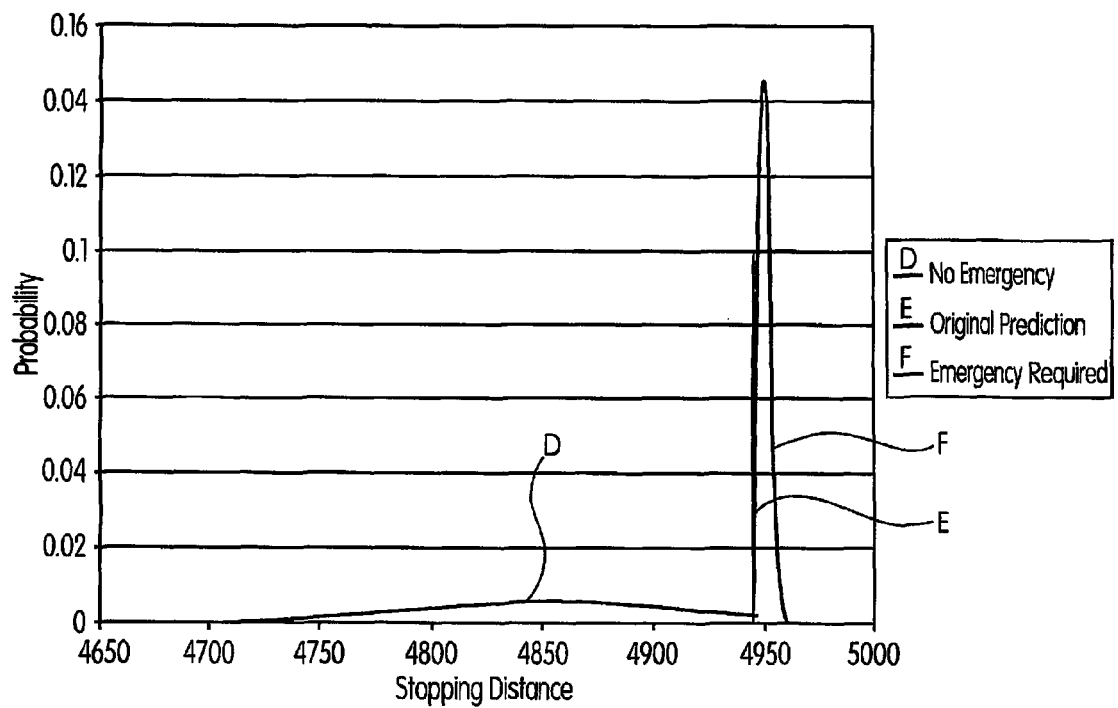
FIG. 4 is a graphical illustration of two probability density functions with the brake applications separated into two groups—emergency braking applied and only service braking applied.

In every parameter under consideration in the normal braking curve determination that had some variation in the value, such variation also exists in the emergency braking case. However, in the case of emergency braking, this variance is much smaller. This difference is illustrated in FIG. 4, where the braking algorithm or model is shown with two probability density functions and the brake applications are separated into two groups—emergency braking applied and only service braking applied. In particular, the chart of FIG. 4 illustrates the probability versus stopping distance for the non-emergency curve D, the original prediction curve E, and the emergency-required curve F.

Table 1 represents the results of a calculation that includes multiplying the standard deviation for the simulation trial by the required number of standard deviations to produce the desired cumulative probability. The probability of having 99.5% of the stops being short of the target with 99% confidence is derived from a Federal Railroad Association research project. Table 1 shows this number as a function of the desired probability.

TABLE 1

| Probability | Number Standard Deviations |
|---|---|
| 84.13400000% | 1.00 |
| 97.72500000% | 2.00 |
| 99.86500000% | 3.00 |
| 99.95000000% | 3.29 |
| 99.99683300% | 4.00 |
| 99.99950000% | 4.42 |
| 99.99997133% | 5.00 |

In the next step, the emergency braking curve is translated so that it starts earlier by some safety factor that meets the proposed safety objective. In one preferred and non-limiting embodiment, a probability of 99.95% is selected, which equates to 3.29 standard deviations. According to the prior art, the determination of the safety factor is a function of only train speed. However, according a preferred and non-limiting embodiment of the present invention, the safety factor determination is a function of train speed, track grade, and train weight. In particular, these three parameters are curve fit to a best fit function to the mean stopping distance. The resulting best fit formula is as follows:

$$F1 = x2$$

$$F2 = x3/300$$

$$F3 = (x1+5)*10$$

$$F4 = (f1*a+b)*(c*f2+d)*(e*f3+f)$$

$$F5 = \exp(g*f1+h*f2+i*f3+j*f1*f2+k*f1*f3+1*f2*f3+m)$$

$$Y = f4*f5$$

Where X1 is grade in percent.
Where X2 is speed.
Where X3 is total train weight in tons.

More than one set of constants are developed as trains with the confirmed availability of Distributed Power (DP) can apply the brakes nearly simultaneously from both the front of the train and a midpoint or rear of the train, depending on the location of the DP locomotives. This results in much shorter stops than a non-DP train with the same grade, speed, and weight.

In one preferred and non-limiting embodiment, the hardware brake interface supports both an automatic brake interface and an emergency brake interface. The emergency brake interface can also be turned "on" or "off" as a configuration parameter. Both brake interfaces may also be continually tested to ensure that the hardware interface can apply the brakes. This leads to a known situation where the emergency brake interface is not available. In this case, the braking and prediction algorithm or model needs to revert to an automatic brake only predictor, and the stopping distances will again have a wider variance. Accordingly, the safety factor determination can utilize the design simulation implemented for the emergency braking scenario, and also use a multi-function safety factor.

There are certain cases that require additional consideration in practical implementation. In a first case directed to light locomotives, and particularly in subdivisions where helper service is required, an excess of locomotives can accumulate at one yard, and a shortage develop at the other end of the helper service. The railroad may make a power move of locomotives only to restore the balance. Locomotive-only consists would use Independent Brakes, which have slightly different propagation characteristics than automatic air brakes. In another case, where stops occur more quickly, e.g., a heavy train going slowly up a hill, and with the confirmed availability of emergency brakes, the calculated safety factor may be short. In some such instances, the brakes have not set up in all the cars, before the train is already at a stop. In these cases, the availability of emergency brakes provides no additional value, as they have no time to become effective. Accordingly, when the stopping time is predicted to be less than about 30 seconds, the safety factor is calculated as if emergency brakes were not available.

In another preferred and non-limiting embodiment, and as discussed above, the braking and prediction algorithm or model is modified to add the use of emergency braking after a full-service penalty braking application, if it is calculated that an emergency braking application is required to stop the train short of the required target (with the required probability). The use of emergency braking allows the determined safety factor for full-service penalty application to be greatly reduced in most instances, which reduces the wide variance evident in actual application of the existing algorithm. As discussed, the existing single-factor (speed) based safety factor for full-service penalty brake applications will be supplemented by the inventive multi-factor (train speed, track grade, and train weight) safety factor for an emergency brake application.

Accordingly, and in implementation, provided is a method and system that lead to: reduced interference with normal crew train handling (e.g., premature enforcements, train stopping long distances from the target, interference when moving trains with small tolerance to length of the train, for example, entering a siding just long enough to hold the train, etc.; reduced variance in overall actual stopping distance; increased crew confidence in the braking algorithm; a clearer understanding of the nature of the performance based requirements and their underlying statistics; and/or emergency braking being used in only a fraction of the required enforcement stops.

Figure 5:
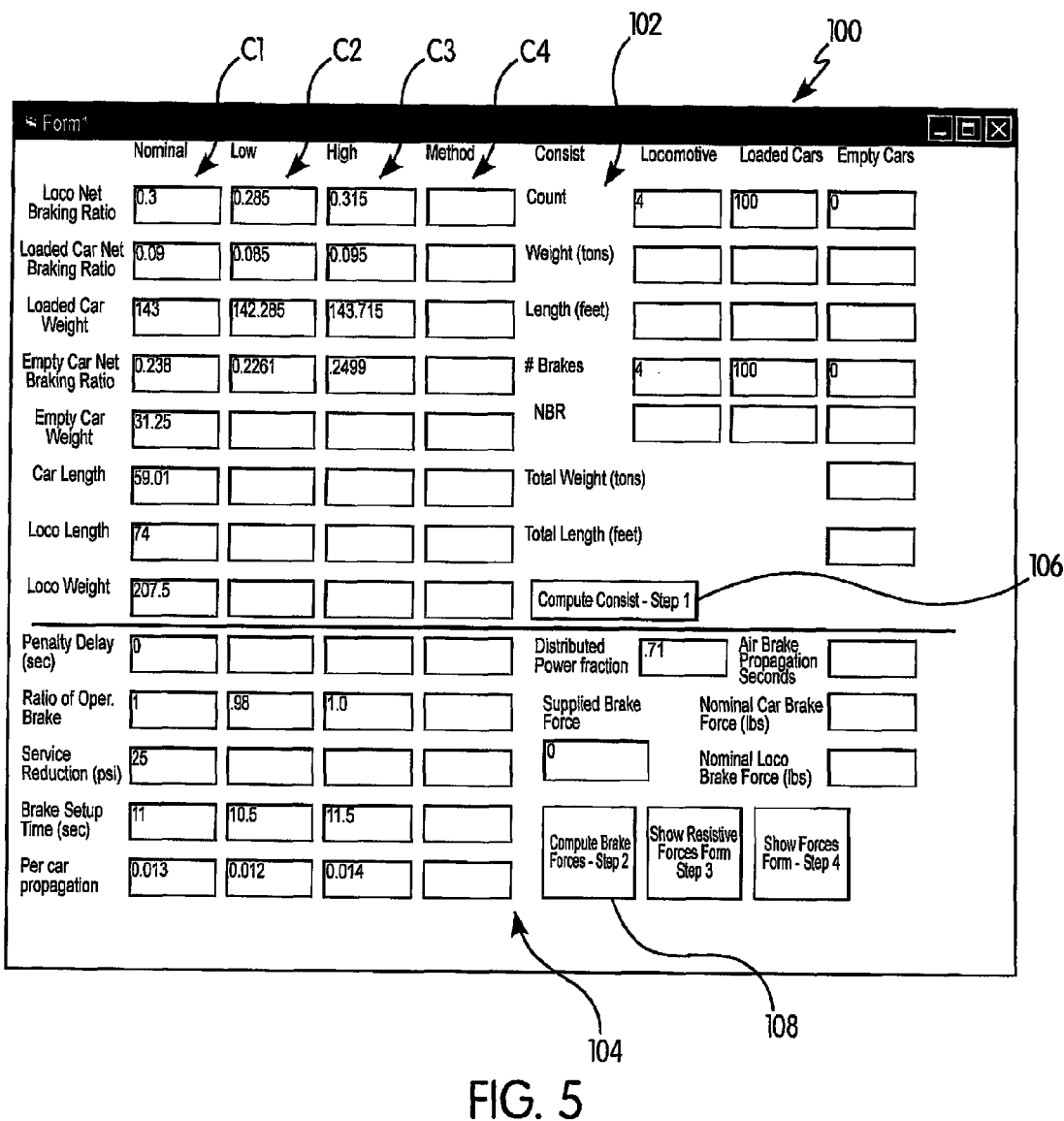
FIG. 5 is an exemplary screenshot of a data input and output form for a first step in a method and process for determining a braking algorithm or model and/or braking distances according to the principles of the present invention.
Figure 7:
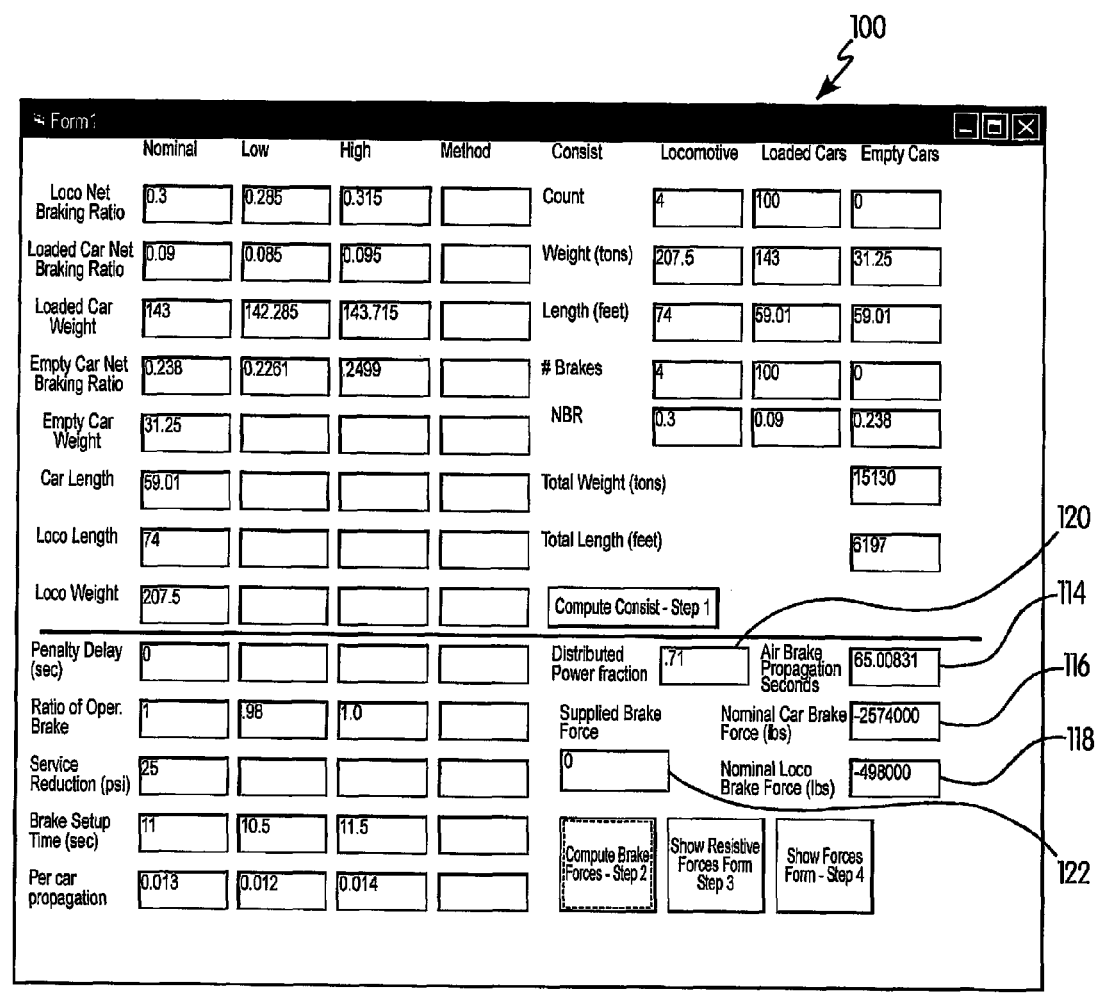
Figure 8:
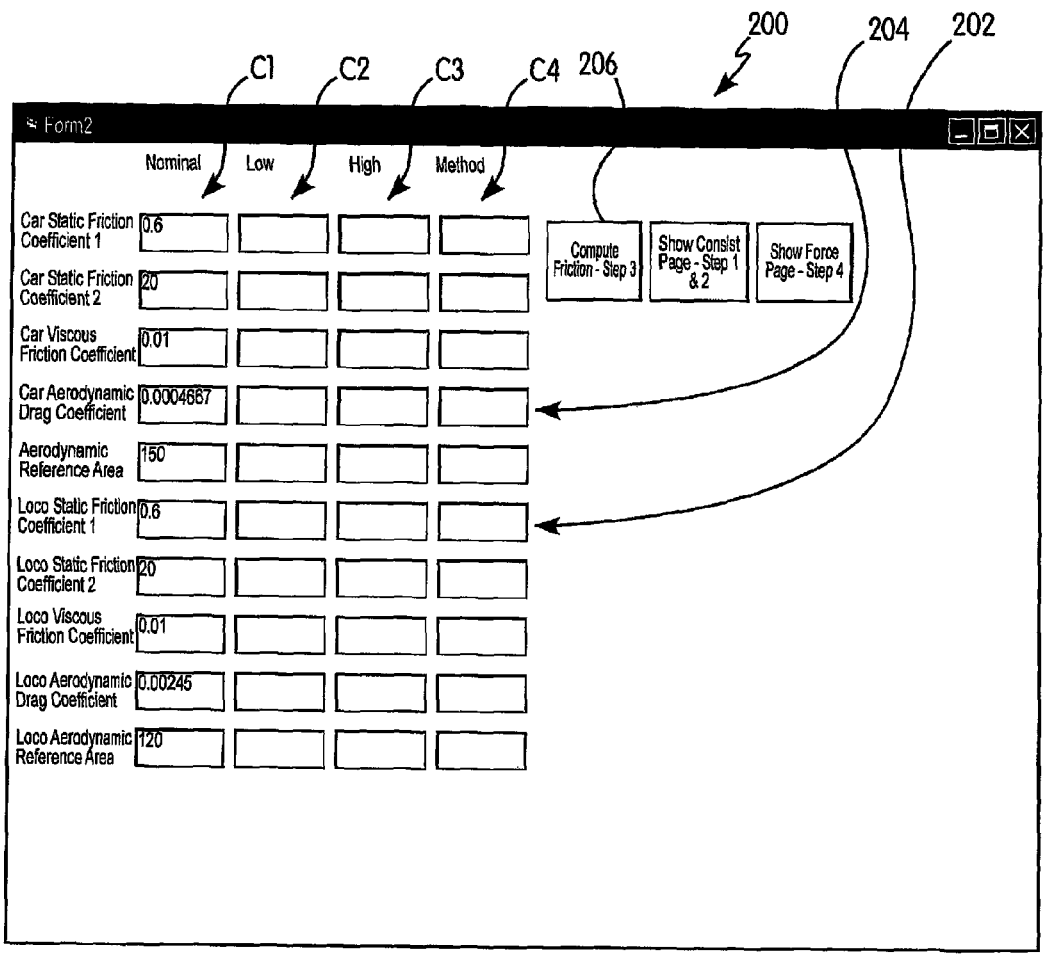
FIG. 8 is an exemplary screenshot of a data input and output form for a second step in a method and process for determining a braking algorithm or model and/or braking distances according to the principles of the present invention.
Figure 10:
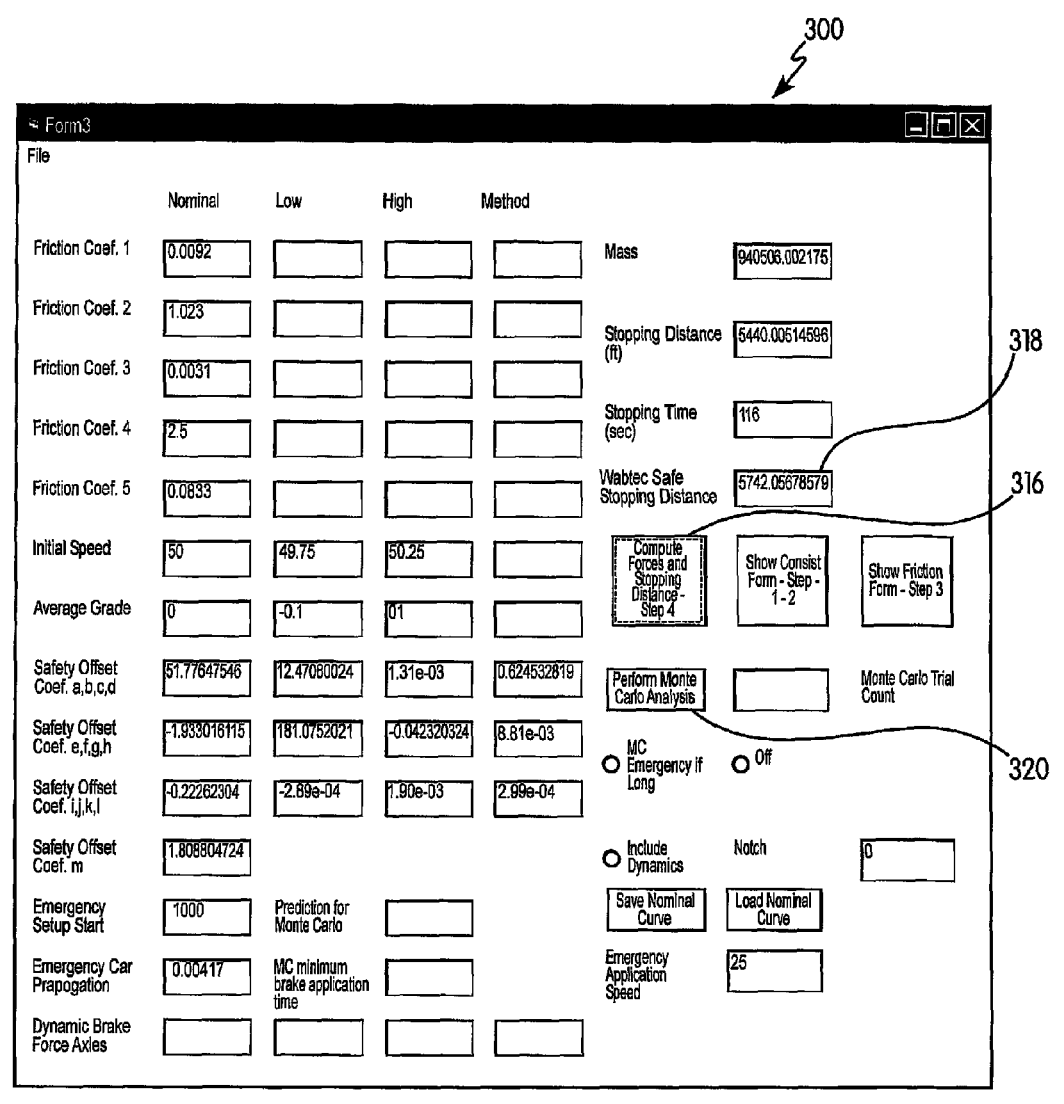
Figure 11:
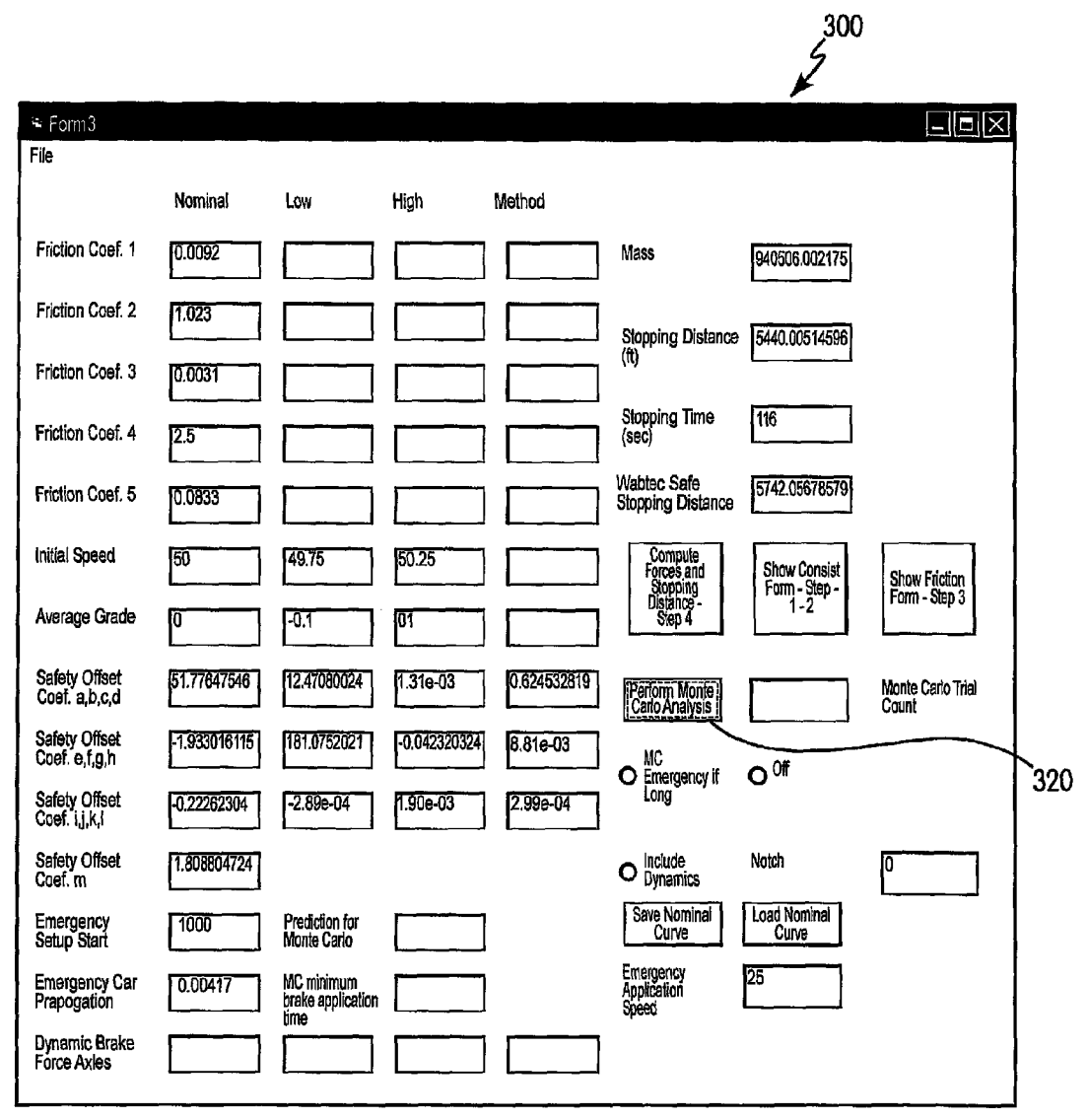

In another preferred and non-limiting embodiment, the simulation to determine the braking algorithm or model and/or the braking distances is determined using an innovative Monte Carlo simulation program having specified input variables. In one preferred and non-limiting embodiment, the input has been segmented into four areas on three different forms, as follows: Form 1 (100; FIGS. 5-7) facilitates the input or calculation of train consist data 102 and braking parameters 104; Form 2 (200; FIG. 8) facilitates the output or calculation of friction data 202 and aerodynamic data 204; and Form 3 (300; FIGS. 9-11) facilitates the input or calculation of friction coefficients 302, speed data 304, grade data 306, safety factor data 308, dynamic brake input data 310, and control parameters 312 (e.g., for controlling the simulation). In these forms, the columns labeled Nominal C1, Low C2, High C3, and Method C4 control the range of variation of a parameter in the Monte Carlo simulation. The nominal column C1 is an externally-defined, assumed, or calculated variable that is to be changed. The low column C2 is the minimum value that the parameter is allowed to assume. The high column C3 is the maximum value that the parameter is allowed to assume. The Method column C4 may be used to define a distribution type for the parameter in question. In one preferred and non-limiting embodiment, all parameter variation uses a uniform distribution, and in the case of a uniform distribution for each iteration for that parameter, a random number is generated in the low to high range, with any number having an equal probability as any other number of in the range. In another preferred and non-limiting embodiment, actual parameter distribution, which may follow a different statistical distribution (such as the normal or exponential distribution), can be utilized. The nominal values are used to calculate a nominal baseline braking distance and are also used when a high and low are not specified.

In one preferred and non-limiting embodiment, the method includes selecting a train consist and entering the appropriate train-related data in Form 1 (100). Once the "Compute" buttons (i.e., "Compute Consist—Step 1" 106 and "Compute Brake Forces—Step 2" 108) on Form 1 (100) have been executed (after entry of the required data), it is not necessary to return to this form if the consist remains constant. FIG. 5 illustrates exemplary input data relating to the consist data 102 before execution of the "Compute Consist—Step 1" button 106, and FIG. 6 illustrates the output after execution of the "Compute Consist—Step 1" button 106, with the primary outputs of total train length 110 and train weight 112.

FIG. 7 illustrates the output after execution of the "Compute Brake Forces—Step 2" button 108, with the primary outputs of air brake propagation 114, nominal car brake force 116, and nominal locomotive brake force 118. Additional inputs on Form 1 (100) include the Distributed Power fraction 120 and Supplied Brake Force 122. In one preferred and non-limiting embodiment, the on-board computer 12 includes a function that computes an effective length of the brake pipe based on where the DP locomotives are located. If DP locomotives are located at the rear of the train, which is the easiest location to add and remove them, then the effective length of the brake pipe is approximately 0.71 times the actual length—allowing the brakes to apply faster as the reduction in commanded brake pipe pressure is coming from both ends of the train. If the DP locomotives are located at approximately two-thirds of the length of the train, the DP ratio is about 0.5. In this case, the brakes apply even faster, as the commanded reduction in brake pipe pressure is travelling toward the rear from the leading locomotives and in both directions from the DP locomotives. The Supplied Brake Force 122 field allows for the override of the model's internally-generated brake force calculations that are based on weight and NBR with a supplied braking force. In this example, the train is 6,197 feet long. The model predicts that in will take 65 seconds for the brake application to reach the full nominal values of braking force of 2,574,000. Because the number of cars exceeds 15, the locomotive braking force will likely be bailed-off in the locomotive engineer's instinctive reaction to the brakes being applied.

In one embodiment, and as illustrated in FIG. 8, Form 2 (200) uses standard aerodynamic constants for the shape of currently employed locomotives and cars. In particular, FIG. 8 illustrates exemplary output after execution of the "Compute Friction—Step 3" button 206, with the primary outputs of friction data 202 and aerodynamic data 204. However, it is recognized that if this method were to be applied to a new type of high-speed passenger train with advanced aerodynamic features, this form allows for such parameter input.

In one preferred and non-limiting embodiment, and as illustrated in FIG. 9, Form 3 (300) uses standard friction coefficients for steel wheels on steel track, and also facilitates the determination or entry for speed and grade. Once a consist has been set, the speed data 304 (e.g., Initial Speed) and grade data (e.g., Average Grade) are varied over a wide range of values, as discussed in further detail hereinafter. Further, on Form 3 (300), a candidate set of safety factor data 308 (e.g., safety offset factor curve fit constants) may be entered to evaluate their effect. In the off-board or simulation application, and in one embodiment, the safety factor data 308 is not included in the generated data that is statically used to generate a safety factor.

In addition, and with continued reference to FIG. 9, Form 3 (300) includes several "what if" control parameters that may be used to develop the algorithm or formula, but may not be used to develop the statistical data used in the on-board implementation. The field "Emergency Setup Start" 314 represents the number of seconds to wait after brake application before the system should consider applying emergency brakes. When set to a large number, the emergency braking is not used. When set to a nominal value, such as 10 seconds, the emergency brakes may be applied if they are required. The dynamic brake data 310 (e.g., Dynamic Brake Force Axles, Include Dynamics, and Notch) allows the simulation or model to account for the dynamic braking effort.

FIG. 10 illustrates exemplary output after execution of the "Compute Forces and Stopping Distance—Step 4" button, which causes the simulation to execute a nominal stopping distance calculation and determine the time it takes to stop the train. If the safety offset coefficients are present, a Safe Stopping Distance 318 is displayed. If the nominal case is acceptable, the "Perform Monte Carlo Analysis" button 320 is executed. The associated display keeps track of the number of trials performed.

The output after one exemplary trial is illustrated in FIG. 11. As discussed above, the simulation or model allows for the inclusion of dynamic brake data 310 in order to further simulate the use or effects of dynamic brakes. In this exemplary embodiment, the Initial Speed was set to 50 mph, and the Average Grade was set to 0%. The next execution of the simulation would generate another set of conditions, such as 50 mph and −0.5% grade. This process is repeated over the desired range of speeds for that train type, and over the range of grades that exist in the real world. This entire process is then repeated for a different train consist (e.g., number of locomotives, number of cars, weight of cars, and train type).

In one preferred and non-limiting embodiment, the simulation does not provide output to the display, and instead provides the output in an electronic file that can be used by standard statistical tools to begin to produce the safety factor. These files may be stored in a standard spreadsheet with similar data, so that statistical tools can be applied. A portion of the data file generated in this above-discussed exemplary trial is shown in Table 2.

TABLE 2

| Trial | Stopping Distance |
|---|---|
| 1 | 5319.015 |
| 2 | 5864.505 |
| 3 | 5485.807 |
| 4 | 5678.694 |

TABLE 2-continued

| Trial | Stopping Distance |
|---|---|
| 5 | 5300.933 |
| 6 | 5413.262 |
| 7 | 5420.592 |
| ... | ... |
| 996 | 5609.687 |
| 997 | 5760.125 |
| 998 | 5448.156 |
| 999 | 5470.288 |
| 1000 | 5294.556 |

In a next step, and as illustrated in Table 3, certain statistical measures are determined or added.

TABLE 3

| | |
|---|---|
| Mean | 5480.598 |
| Standard Deviation | 176.3731 |
| Probability | 0.995 |
| Normsinv | 2.575829 |
| Safety Factor | 454.307 |

| Trial | Stopping Distance |
|---|---|
| 1 | 5319.015 |
| 2 | 5864.505 |
| 3 | 5485.807 |
| 4 | 5678.694 |
| 5 | 5300.933 |
| 6 | 5413.262 |
| 7 | 5420.592 |
| ... | ... |
| 996 | 5609.687 |
| 997 | 5760.125 |
| 998 | 5448.156 |
| 999 | 5470.288 |
| 1000 | 5294.556 |

With reference to Table 3, the first two entries represent the standard statistical measures of mean and standard deviation. The probability goal is that 99.5% of the stops should be short of the target. The next entry is the number of standard deviations required to reach the 99.5% goal, which is calculated by a spreadsheet function. The safety factor (or offset) required is then the number of standard deviations required multiplied by the standard deviation, which represents the number that is then stored along with the speed, weight, and grade (i.e., the independent variables) and the safety factor (i.e., the dependent variable). Next, and in this embodiment, for test cases analyzed for a particular train type, the results are curve fit so that an appropriate safety factor can quickly be calculated from a formula when needed.

Figure 12:
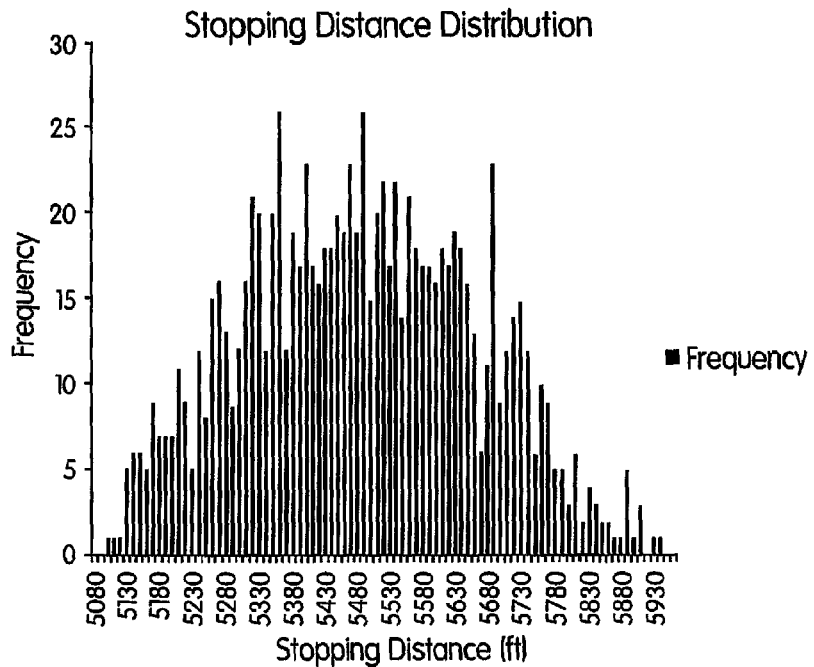
FIG. 12 is a graphical illustration of a stopping distance distribution from an exemplary trial in a process according to the principles of the present invention.
Figure 13:
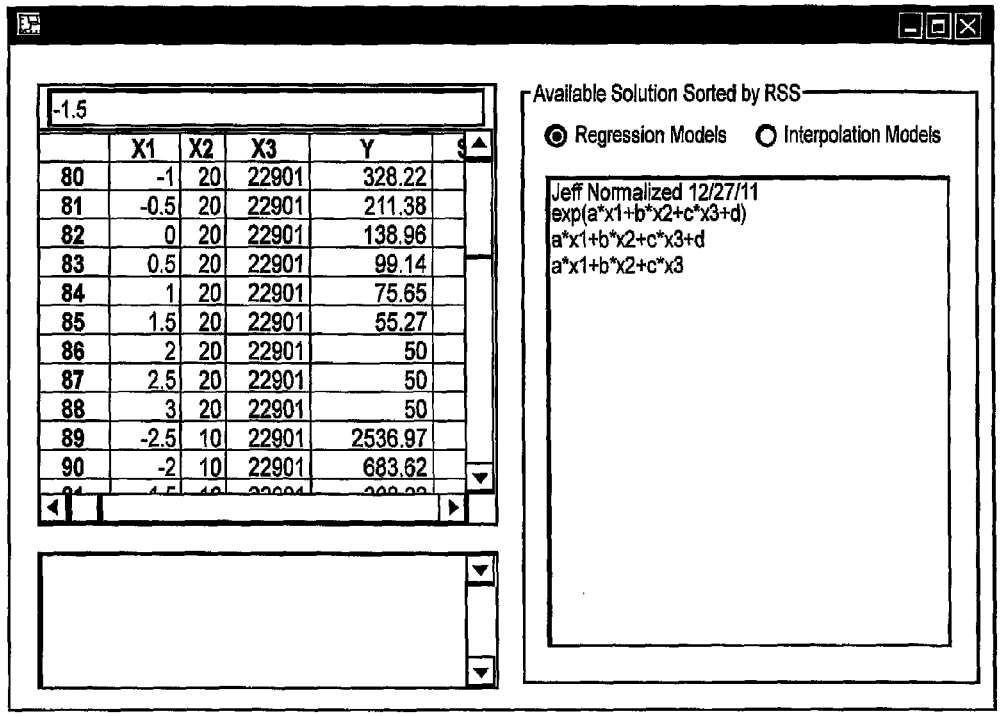
FIG. 13 is an exemplary worksheet including sample input data for a specified train type, and available formulae applicable to curve fit the data, according to the principles of the present invention.

The resulting stopping distance distribution from the exemplary trial discussed above is illustrated in FIG. 12. If this is the range of predicted stopping distances that might occur with the variances that have been simulated, then the calculated safety factor should be added to the nominal value to ensure that 99.5% of the stops will stop short of the target. A large table of speed, weights, and grades is built or established for each consist type, and this is used in connect with a typical curve-fitting equation solver program. As discussed, and in this embodiment, there are three independent and one dependent variable to be curve fit. The simulation or model is supplied with several standard equation curves for this set of variables, and the simulation ranks the solutions for all equations for which it determines a solution. In one embodiment, the ranking process is based on the equation that produces the lowest residual error (i.e., the difference between the original dependent observations (safety offset) for that set of independent variables (speed, weight, and grade,) and what the curve fit equation gives for the same set of independent variables). One preferred and non-limiting embodiment illustrating exemplary input data for one train type, and the equations that would be applicable to curve fit the data, is illustrated in FIG. 13, where X1 is grade in %, X2 is speed in mph, X3 is weight in tons, and Y is the safety factor (or offset). In this embodiment, the resulting curve fit data for the best equation is illustrated in FIG. 14, and for the next best equation is illustrated in FIG. 15. In one preferred and non-limiting embodiment, the average residual for the preferred equation is 19 feet, and for the next best equation is 194 feet. This new multi-factor safety factor is applied to several different train consist types. Alternate methods may be used under some conditions, and additional safety factors can be added under certain conditions.

In one preferred and non-limiting embodiment, curve fit constants of the preferred type are maintained for the following train types:

Distributed Power enabled without emergency—The train consist type is freight or intermodal. This category is chosen when the consist information indicates that the locomotives are located in more than one group (i.e., locomotive groups are separated by one or more cars) and the locomotive computer indicates that Distributed Power is being used to control locomotives not in the lead group, and the ability to use emergency brakes is currently not configured or believed to be unavailable. The curve fit constants for this category are provided in Table 4.

TABLE 4

| Curve Fit Constant | Value |
|---|---|
| a | 51.77647546 |
| b | 12.47080024 |
| c | 0.001307653 |
| d | 0.624532819 |
| e | −1.933016115 |
| f | 181.0752021 |
| g | −0.042320324 |
| h | 0.00881127 |
| i | −0.22262304 |
| j | −0.000289011 |
| k | 0.001899393 |
| l | 0.000298758 |
| m | 1.808804724 |

Distributed Power disabled without emergency—The train consist type is freight or intermodal. The consist does not show more than locomotive group or the locomotive computer is indicating that DP control is not enabled, and the ability to use Emergency brakes is currently not configured or believed to be unavailable. The curve fit constants for this category are provided in Table 5.

TABLE 5

| Curve Fit Constant | Value |
|---|---|
| a | 9.186964431 |
| b | 31.99316911 |
| c | 0.004867186 |
| d | 0.002118959 |
| e | −1.57054E−06 |

TABLE 5-continued

| Curve Fit Constant | Value |
|---|---|
| f | 36.42387028 |
| g | −0.017143536 |
| h | 0.079753678 |
| i | −0.03987273 |
| j | 0.000263205 |
| k | 0.000450963 |
| l | −0.002073447 |
| m | 0.319391519 |

DP Disabled with Heavy Train—The train consist type is freight or intermodal. The total train weight exceeds 12,621 tons. The consist does not show more than locomotive group or the locomotive computer is indicating that DP control is not enabled, and the ability to use emergency brakes is currently not configured or believed to be unavailable. The curve fit constants for this category are provided in Table 6.

TABLE 6

| Curve Fit Constant | Value |
|---|---|
| a | 25.56424908 |
| b | 75.83001673 |
| c | 0.004701046 |
| d | −0.147500171 |
| e | −1.1429E−05 |
| f | 142.2346908 |
| g | −0.016561476 |
| h | 0.06716024 |
| i | −0.093221032 |
| j | −0.000638012 |
| k | 0.001414261 |
| l | −0.00162434 |
| m | 1.118744212 |

Passenger or Commuter—These curve fit constants are used when the consist train type is Passenger, Commuter, Tilt, or High Speed. The primary differentiator for the brake algorithm is that the train has both a brake pipe and charging pipe that run the full length of the train. Certain passenger trains, such as the Amtrak Auto-Train, do not meet this criteria and must be treated as a freight train for braking purposes. The curve fit constants for this category are provided in Table 7.

Table 7

| Curve Fit Constant | Value |
|---|---|
| a | 4.838489033 |
| b | 2.338160497 |
| c | 0.027494146 |
| d | −0.02124726 |
| e | 1.84478E−06 |
| f | 27.69784938 |
| g | 0.01686011 |
| h | −0.066620917 |
| i | −0.031432665 |
| j | −0.00087125 |
| k | 5.41015E−05 |
| l | −0.001101268 |
| m | −0.177576527 |

Short train—A short train is classified as a train with no cars if the consist type is unknown or a train of a configurable number of cars (e.g., with a default of 15) where, under normal practice, an engineer would attempt to bail off the independent locomotive brakes when the train type is Unknown, Freight, or Intermodal. When two or more locomotives are connected the standard brake interconnection includes 4 pneumatic brake pipes where two of these pipes control the independent application and release of the locomotive independent brakes. The curve fit constants for this category are provided in Table 8.

TABLE 8

| Curve Fit Constant | Value |
|---|---|
| a | 5.537060519 |
| b | 6.357319181 |
| c | 0.001367731 |
| d | 0.040339996 |
| e | 2.08278E−07 |
| f | 15.14481262 |
| g | 0.028845829 |
| h | 0.040564789 |
| i | −0.031643064 |
| j | −0.000643688 |
| k | −0.000169019 |
| l | −0.000146278 |
| m | −0.126790251 |

In another preferred and non-limiting embodiment, provided is an algorithm or model for use by the on-board computer 12 in connection with enforcement function for computing estimates of stopping distance. This estimate is updated periodically and frequently, and used to support on-board logic (e.g., program instructions on the on-board computer 12) to detect and prevent anticipated violations of targets created for restrictions, such as movement authorities and speed limits. In this embodiment, the stopping distance computed represents a conservative estimate for the case where a full-service penalty brake application is commanded at conditions existing at the moment the calculation is made. Further, in one preferred and non-limiting embodiment, the algorithm or model also provides for an emergency brake application if a full service brake application is not stopping the train as expected.

In one preferred and non-limiting embodiment, the method according to the present invention employs a numerical algorithm or formula based on a dynamic force-acceleration model of the train. As discussed hereinafter, both the design engineering task and the operation of the on-board system share the same model of the train dynamics and brake system operation. The design effort produces the equation coefficients from simulation and feedback from testing. In this embodiment, the on-board system evaluates the same model under three different sets of initial conditions.

Figure 16:
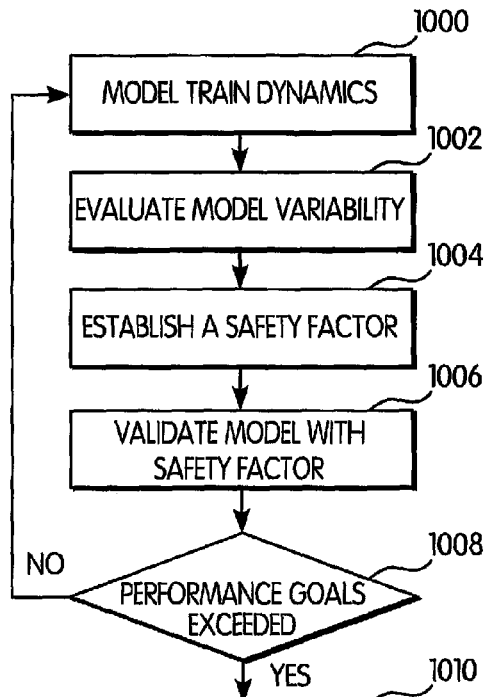
FIG. 16 is a flow diagram of a method or process for a design (or simulation) model for determination of a safety factor according to the principles of the present invention.

One preferred and non-limiting embodiment of the design (or simulation) model or engineering task is illustrated in FIG. 16. As shown, and in a first step 1000, the modeling of train dynamics includes the known effects of brake application. For example, manufacturers of train braking equipment normally test it in a laboratory setting using racks of brake equipment simulating a 100-car train. As discussed above, every $n^{th}$ brake in such a rack can be completely instrumented and an accurate prediction can be made of future performance. In a real train, the braking equipment is not always 100 cars under the exact same conditions, and the collection of this much data is not practical. Accordingly, a model must be found that provides a reasonable approximation of braking forces with much less data. Similarly, locomotive motor and brake forces could be measured if a dynamometer car were included in every consist, which is impractical.

In a next step 1002, variability of the model is evaluated, recognizing that many of the parameters are supplied as standard or assumed values with estimated variance and some of the variances are based on the resolution of the sensor. In the design effort, it can be shown which of the variables in the model have the greatest contribution to the overall model. For example, a 1% change in an aerodynamic friction coefficient affects the braking distance very little; however, a 1% change in speed or total train weight can have a much larger effect. The next step 1004 establishes a safety factor, and is based upon the equations of the train dynamics and the expected values with accompanying variances, which can be used to estimate the error in the result. In this embodiment, and as discussed above, this step is implemented using a Monte Carlo simulation. In a next step 1006, the model is validated with the safety factor, where candidate safety factors are validated against previous laboratory test results (i.e., regression tests). They are then evaluated against a TOES braking model, and final tests are then evaluated on actual trains under varying consist, speed, and grade conditions. Step 1008 includes evaluating or establishing the performance goals, where the simulations conducted during the design phase produce expected outcomes and are used to assess the distribution in shape and magnitude of the variance in the results. This distribution is then adjusted such that 99.5% of the trial stops in the simulation stop the train short of the target, and this movement or adjustment of the distribution constitutes the safety factor, which can be used in the simulation or model (step 1010).

Figure 17:
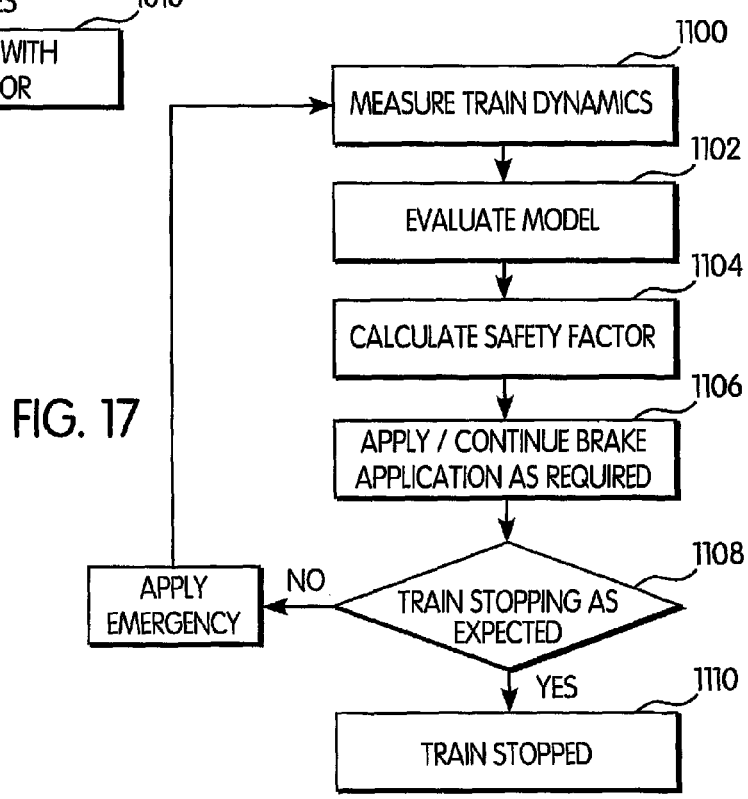
FIG. 17 is a flow diagram of a method or process for an on-board model for use of a safety factor according to the principles of the present invention.

In another preferred and non-limiting embodiment, the on-board computer 12 is used to brake the train and/or establish the safety factor, as illustrated in FIG. 17. In this embodiment, and in a first step 1100, the train dynamics parameters are measured, and these are the same parameters that are chosen in the Model Train Dynamics step 1000 of the design model discussed above; however, the on-board implementation utilizes actual speed, brake pipe pressure, and location that actually exist at that instant. In the next step 1102, the model is evaluated (and this is the same model in the design process described above), however the parameters used are the actual parameters. In a further step 1104, the safety factor is calculated based on the statistical analysis in the design model, but in this on-board implementation, the required safety factor is calculated directly. In step 1106, the brakes are initially applied or continually applied, as required. In particular, when the braking curve impinges on any target, the automatic brakes are applied. At this point, and in one embodiment, the model continues to run at a 1 Hz rate, but for the purpose of modeling an emergency brake application. Further, several key values in the model are set to a worst case value, and the air model shifts to one that includes the emergency reservoir and increased braking forces available with emergency braking.

In a next step 1108, the on-board computer 12 evaluates whether the train is stopping as expected. If it is, the on-board computer 12 monitors the process and takes no additional action, and the train stops (step 1110). However, if the train is not stopping as expected, the worst-case braking curve (using the changed key parameters (as discussed hereinafter)) would impinge on the target. This causes the emergency brakes to be applied (step 1112). Inclusion of this option for use of emergency braking in the algorithm provides the option to reduce conservativeness in the penalty safety factor calculation, while still retaining the overall confidence of stopping short of the target. The design goal here, for the sake of minimizing operating impact is that approximately 1 in 5 enforcement actions would result in an emergency application. The availability of emergency braking also reduces the variance (both longer and shorter than the nominal) in stopping distance. This allows reduction in the penalty safety factor.

In one preferred and non-limiting embodiment, the on-board brake model is executed three times each second as follows. The first execution of the braking model provides an estimate of a stopping distance if the brakes were applied now. This is commonly called the braking curve or braking distance. The second execution of the on-board braking model provides an estimate of the location where the "warning" for a target would occur. This is done with the current locomotive 10 control settings. The third execution of the on-board braking model provides the estimate of the stopping distance from the location and speed at the end of the warning time. The last two distances are combined to form what is commonly referred to as the warning curve or warning distance.

Figure 18:
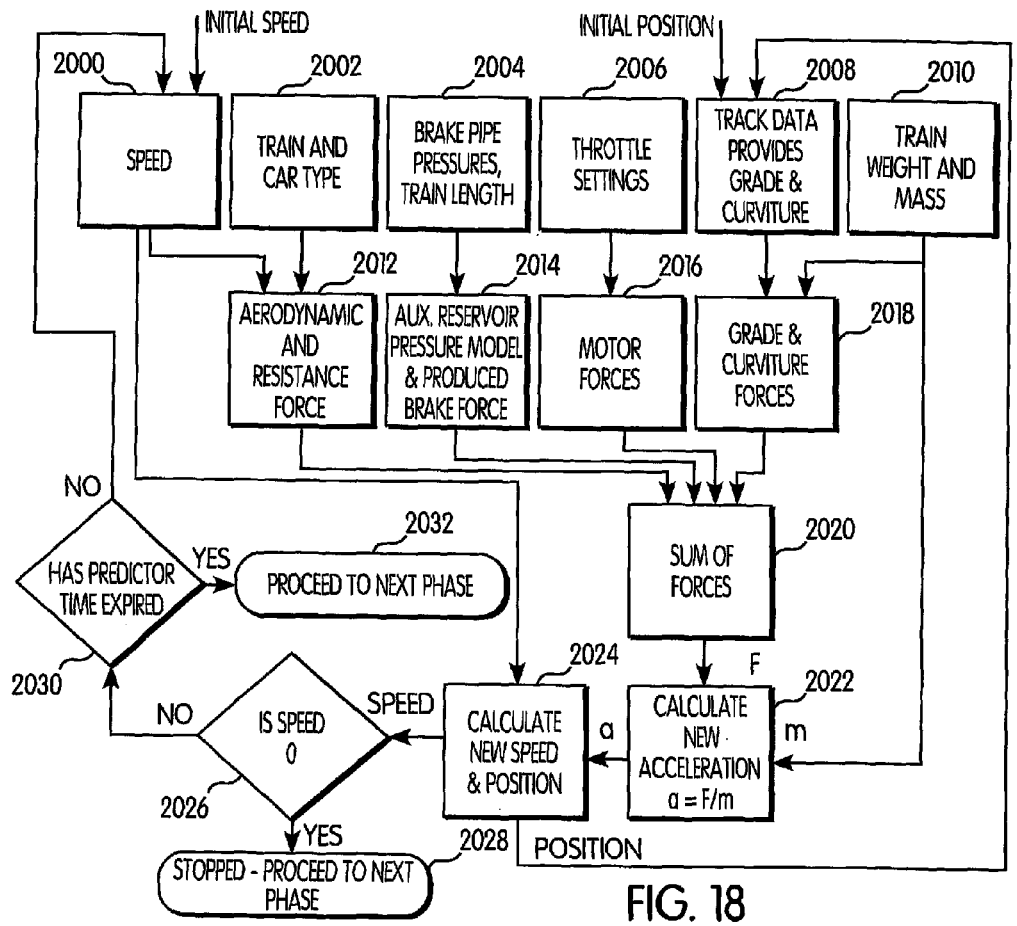
FIG. 18 is a schematic diagram of a method or process for implementing or using a braking algorithm or model according to the principles of the present invention.
Figure 19:
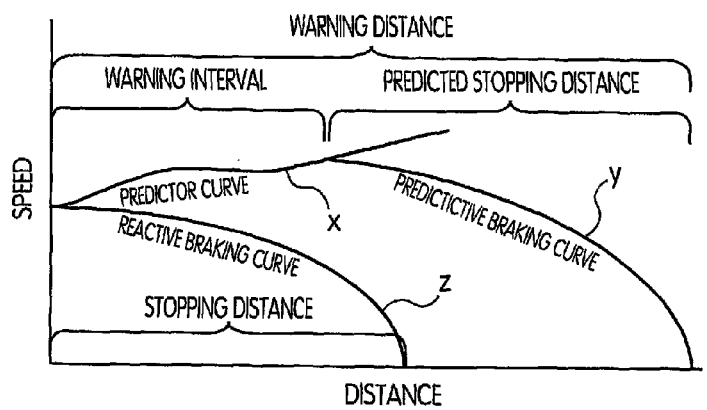
FIG. 19 is a graphical illustration of one exemplary embodiment of a predictor curve, a reactive braking curve, and a predictive braking curve according to the principles of the present invention.

One preferred and non-limiting embodiment of this process is illustrated in a flowchart in FIG. 18, and the results of such a calculation are illustrated graphically in FIG. 19. In particular, the model or process obtains the speed (block 2000), whether the initial speed or the updated speed, the train and car type (block 2002), the brake pipe pressures and train length (block 2004), the throttle settings (2006), the track data relating to grade and curvature (block 2008), based upon the initial position or an updated position, and the train weight and mass (block 2010). The speed (block 2000) and train and car type (2002) are used to determine the aerodynamic and resistance force (block 2012), and the brake pipe pressures and train length (block 2004) are used to in connection with or to determine the auxiliary reservoir pressure data and produced brake force (block 2014). Further, the throttle settings (block 2006) are used to determine the motor forces (block 2016), and the track data (block 2008) and train weight and mass (block 2010) are used to determine the grade and curvature forces (block 2018). All of these forces (blocks 2012-2018) are summed at block 2020.

These summed forces (block 2020) are used to determine the acceleration (a=F/m) at block 2022, together with the train weight and mass (block 2010), and this determined or calculated acceleration (block 2022) is used to calculate a new speed and position at block 2024. The updated position is again used in connection with the track data (block 2008) to determine the grade and curvature forces (block 2018). In addition, the updated speed is checked at block 2026 to determine whether it is zero (i.e., the train is stopped (block 2028), in which case the model may proceed to the next phase). If the updated speed is greater than zero, then it is determined whether the predictor time has expired (block 2030). If the predictor time has expired (block 2030), the model moves to the next phase (block 2032). However, if the predictor time has not expired (block 2030), the updated speed is used as the speed (block 2000) to determine updated aerodynamic and resistance force (block 2012).

In one preferred and non-limiting embodiment, the components of the on-board stopping distance estimation function naturally group into the following five divisions as follows:

Parameters—establish the values of inputs used for the calculation of braking distance. These take the forms of values that are: externally defined, such as train consist information; assumed, which represent a reasonable, conservative judgment, based on average or typical conditions; and calculated or estimated, i.e., derived from other parameters. This process repeats on an infrequent basis, e.g., upon receipt of one or more updated parameter values.

Modeling the Brake System—for freight trains, continually observe head-end and tail-end brake pipe pressures (BPP) for the purpose of deducing the values of the fully-charged BPP, brake pipe reduction, average auxiliary reservoir pressure (ARP), and maximum total available braking force. This process preferably repeats on the order of about once per second. For passenger and commuter trains using a continuous charging pipe and having a graduated release, the brake cylinder pressure is modeled in a similar fashion, but more directly.

Force Calculation—perform an estimation of the forces acting upon the train, including: Grade—assess the grade under and ahead of the train; Curvature—assess the curvature under and ahead of the train; Friction—calculate the air and friction forces; Motor Force—calculate the motor force supplied by the locomotives in the train; and Braking Force—calculate the braking force from the braking model. This process preferably repeats on the order of about once per second.

Stopping Distance Calculation—perform a numerical integration of the force-acceleration equation to determine stopping distance and deceleration profile or curve. The latter is a sequence of ordered pairs of position and speed, which defines the speed versus distance relationship from the point of brake application to the stopping point. The parameters and operating variables forming the inputs to the process are those existing at the moment the process is initiated. This process preferably repeats on the order of about once per second.

Safety Factor Adjustment—derived from the statistical distribution of stops, based on a nominal input with the parameters discussed above varied over a specified range. The safety factor (or offset) is calculated such that it will provide assurance to a specified probability that the required stopping distance will be safely short of a target.

As discussed above, various parameters are used in the braking analysis and model. In one preferred and non-limiting embodiment, the externally-defined parameters (which may be provided in the consist message) are illustrated in Table 9.

TABLE 9

| Parameter | How Used | Representative Values | Used to Select Safety Offset coefficients? |
|---|---|---|---|
| Train Type | Differentiates some very high level differences in the physical implementation of the braking system on the train | Freight Intermodal Passenger Commuter High-Speed Passenger | Yes |
| Number of Locomotives | A factor in determining the motor and braking forces in the train | 1-24 | Yes |
| Locomotive Position in the Train | This parameter is used to determine if the train is configured for DP operation and to correctly model the air brake setup time on DP trains. | 1-999 | Yes |
| Tonnage of Locomotive | This parameter is used to calculate total weight of the train and to calculate the brake force per locomotive | 50-400 tons | |

TABLE 9-continued

| Parameter | How Used | Representative Values | Used to Select Safety Offset coefficients? |
|---|---|---|---|
| Locomotive Status | This parameter is used to determine if motor force for that locomotive should be included in the braking calculation | Run Isolate | |
| Locomotive Horsepower | This parameter is used in the Predictor calculation to estimate future location of the train and is also used in the Braking Calculation at the beginning of the brake application while propulsion power has not yet been cut off. | 0-10000 hp | |
| Trailing Tonnage | This parameter is combined with locomotive tonnage to determine the force on the train due to gravity. If brake force is not supplied in the consist data, then Trailing Tonnage is also used to calculate braking force | 0-45000 tons | Yes |
| Empty Car Count | If brake force is not supplied it is used to calculate a brake force with an appropriate Net Braking Ratio | 0-999 | Yes |
| Number of Operative Brakes | Used to determine car braking force, when braking force is calculated by the on-board. | 0-999 | |
| Number of Axles | In Intermodal trains the number of actual brake valves need to be calculated. For every four axles in an intermodal train there is one brake valve | 0-3996 | |
| Train Length | Used to calculate brake application time | 40-25000 ft | |
| Loaded Car Count | If brake force is not supplied it is used to calculate a brake force with an appropriate Net Braking Ratio | 0-999 | Yes |
| Total Braking Force | If supplied it replaces any braking force calculated from empty and loaded cars and an appropriate Net Braking Ratio | 0-30000000 lbs. If supplied value is outside this range the onboard system makes its own estimate. | |
| Maximum Train Speed | This would be combined with any other train speed restrictions to provide the minimum speed to be enforced. In the predictor algorithm speed at current throttle notch is estimated, but would be limited to the speed at which an over-speed reactive enforcement would occur | 0-125 mph | |

In another preferred and non-limiting embodiment, and with reference to the parameters used in the braking analysis and model, the assumed parameters may include several parameters that are conservative, but not the "worst case". This approach allows for the determination or use of reasonable stopping distance calculations. The safety impacts related to assumptions on these parameters may be validated through Monte Carlo simulation, where variation of all parameters is considered concurrently.

In one preferred and non-limiting embodiment, the assumed parameters include: (1) in the freight case: Weight of Empty Car (As this is not supplied in the consist, an empty car weight of 48,000 lbs may be assumed if a valid Total Braking Force is not supplied.); Weight of Loaded Car (Calculated algebraically based upon trailing weight and the ratio of loaded and empty cars in the consist.); Net Braking Ratio for Freight Locomotive (A conservative, but not worst case value is assumed. In this embodiment, this parameter is only important for trains less than 15 cars when the algorithm assumes that the engineer does not react to an enforcement braking action by bailing off the locomotive independent brake.); Net Braking Ratio for Loaded Freight Car (A conservative, but not worst case value, is assumed, and this only used if total braking force is not supplied.); Net Braking Ratio for Empty Freight Car (A conservative, but not worst case value, is assumed, this only used if total braking force is not supplied.); and Number of Brake Valves (Intermodal cars are defined by the number of wells for carrying containers with which they are constructed. A single-well car has two couplers, two trucks, and one brake valve. A three-well car has two couplers, four trucks, and two brake valves (the center two trucks directly support the ends of two wells). Similarly a five-well car has two couplers, six trucks, and three brake valves. The general rule is that for every four axles in an intermodal train, there is one brake valve. The brake application time is a function of the number of brake valves and the length of the brake pipe.); (2) in the passenger/transit case: Passenger Locomotive Net Braking Ratio (A conservative, but not worst case value, is assumed.); Passenger Car Net Braking Ratio (A conservative, but not worst case value, is assumed.); Transit Locomotive Net Braking Ratio (A conservative, but not worst case value, is assumed.); and Transit Car Net Braking Ratio (A conservative, but not worst case value, is assumed. Cab cars of the same general style and similar weight would use this NBR.); and (3) in the short train case: When a train consists of a single light locomotive or several locomotives and only less than 15 cars, the airbrake propagation model that assumes no bail-off will occur. Locomotives operating as a Multiple Unit are connected by additional brake pipes that allow for direct application and release of the locomotive independent brakes. A different safety factor is also applied in this case.

In one preferred and non-limiting embodiment, and with respect to the brake forces, the calculated or estimated parameters include Nominal Braking Force, which is either supplied or calculated from the supplied data. This represents the nominal braking force that is available in the steady state when all brake cylinders have reached their maximum travel, and the brake shoes are at the nominal expected force for a full-service application. A braking event initiated by the PTC system is assumed to end before heating affects begin to reduce this force.

In one preferred and non-limiting embodiment, and with respect to the air brake model, the calculated or estimated parameters include: (1) in the freight case: Average Auxiliary Reservoir Pressure (ARP) (There is a reservoir associated with each brake valve, but typically there is no instrumentation that provides pressure data for each of these ARP. Instead, the pressure is modeled using an average ARP model. This model has four states, including: Applying, Applied, Recharging, and Recharged. While most PTC brake tests are conducted from a fully Recharged state, the braking algorithm or model is designed to work with the model starting in any state. The modeled Auxiliary Reservoir Pressure is used to determine the amount of braking force that is available. Greater pressure in the Auxiliary Reservoir translates to greater force that can be exerted by the brake cylinder.); Brake Pipe Pressure Drop (If the EOT is functioning correctly, the brake pipe pressure drop is the difference between the measured front and rear brake pipe pressure. If a rear brake pipe pressure is not available, a conservative estimate of a 15 psi drop is assumed. The brake pipe pressure differential between front and rear is used to determine the maximum amount of charge that can be achieved in the Auxiliary Reservoirs. A greater differential that would result from higher leakage rates translates to less air available to charge the Auxiliary Reservoirs.); Brake Application Time (The time that it takes to fully apply the car brakes. Nominal Brake Force is based upon the length of the train (the effective length of the brake pipe).); and Distributed Power (DP) Ratio (When a DP consist is configured, a PTC application made at the front of the train is relayed to the trailing consists by a radio message, which commands these trailing consists to also make a full-service brake application. Brake Application Time is reduced when an application is initiated from multiple points in the train. The amount of Brake Application Time reduction is a function of the location of DP remote units within the train consist.); (2) in the passenger/transit case: Nominal Braking Force (The concept of Loaded and Empty cars is excluded, and the brake force is solely based upon the supplied car weight.); and Application time and Release Time (The ARP charging model used in the freight case does not fit the passenger model, as there is a constant charging pipe. Passenger brake valves operate faster and support graduated release. Once a passenger brake application is in effect, a further increase or decrease in BPP produces a resultant decrease or increase in cylinder pressure much quicker than the corresponding freight case.); (3) Friction Coefficient (Once a brake shoe force has been calculated, it should be adjusted by the available friction. The equation for this is a function of speed.); (4) Adhesion Coefficient (It is noted that there exists a steel-on-steel adhesion coefficient, and that if the braking force exceeds this value, then that braking force must be limited to this number.); and (5) Train Resistance (A modified version of the Davis Formula for train resistance provides an estimate of the resistance to movement of the train. While this contribution is small, exact data is usually not available on a car-by-car basis to estimate train resistance. In this embodiment, the required coefficients in the model are supplied for the following types: Freight Cars, Freight Locomotives, Passenger Cars, Passenger Locomotives, Transit Cars, and Transit Locomotives.)

In one preferred and non-limiting embodiment, and with respect to the penalty or pneumatic control switch delay, where the connection between the PTC system and the locomotive is controlled by the existing locomotive architecture for penalty brake applications, the calculated or estimated parameters include: (1) Penalty Delay (The connection to the locomotive that will activate the penalty application may be connected in a way such that a mechanical, electrical, or software component may induce a delay in the application of the brakes. The penalty delay is measured at departure test and is used to adjust the Brake Application Time.); and PCS Delay (During this delay, locomotive motor force continues to be applied to the train. This PCS delay is also measured during departure test.)

In one preferred and non-limiting embodiment, the measured or derived parameters include: (1) Speed (or PTC Speed) (The PTC Speed is determined from wheel tachometers and GPS speed. The wheel tachometer speed is based on a wheel diameter, which is continually being calibrated by the PTC system.); (2) Brake Pipe Pressure, including: Front Brake Pipe Pressure (This pressure is measured through a combination of available sources that may include a Locomotive Interface Gateway (LIG), serial data source from an electronic air brake, or discrete pressure transducers. Redundancy for safety requires that this data be available from at least two sources.); and Rear Brake Pipe Pressure (A rear brake pipe pressure is available when the train is equipped with an operating End of Train (EOT) device or in a Distributed Power (DP) consist when there is a locomotive group at the end of a train. For passenger and commuter trains there is a second charging brake pipe, so the rear brake pipe pressure is the same as the front. In other circumstances, when a rear brake pipe pressure is not available, a 15 pound reduction between the front and rear is used.); (3) Grade (The grade under and ahead of the train comes from a validated track database. Grade is calculated by evaluating the elevation difference between the head and rear of the train. Any undulations in grade between these two points cancel out, resulting in a simple equivalent grade over the train.); (4) Curvature (The curvature under and ahead of the train comes from a validated track database. Curvature forces are additive and always produce a retarding force.); and (5) Mass of Train (The mass of the train is calculated by multiplying the gravitational constant times the total weight of the train.)

In one preferred and non-limiting embodiment, and when modeling the train braking system 26, and in the freight case, the brake pipe must be continually monitored to determine if the engineer has applied any amount of train brakes, as this impacts the brake system model and train resistance model. In addition to monitoring the brake pipe to determine brake set and release commands, the on-board computer 12 also makes an evaluation of the feed valve setting when not explicitly provided. When available, the EOT pressure is monitored and a difference of front-to-rear brake pipe pressure is calculated. An initial conservative value is established for the average ARP and is adjusted from brake pipe pressure observations. When the front brake pipe pressure drops or rises below an application threshold or above a release threshold, the internal ARP model changes state and begins to change the air pressure in the average ARP model by an appropriate formula. If the state of the ARP model is "applying", the brake force builds up in accordance with the ratio of reservoir volume to brake cylinder volume over the expected brake application time. If the ARP state is "applied", then the nominal brake force is maintained. When the model switches to calculating an emergency curve, it starts including the emergency reservoir within the braking calculation. The model combines the AR and ER as if they are one large reservoir that will drive the brake cylinder. The model starts by using the current BCP and works backwards. It uses the current BCP, current ARP, and nominal ARP to calculate a new equilibrium pressure for the AR, ER, and BC. Then, the model calculates the current average pressure of the AR and the ER as if it is one reservoir and the application time is significantly less.

In one preferred and non-limiting embodiment, and when modeling the train braking system 26, and in the passenger/transit case, the EOT brake pipe pressure is not available, and any drop is assumed to minimal due to the short train length. The ARP model is also modified as there is a constant charging pipe available. The front brake pipe pressure is monitored and filtered the same as in the freight case, but a simpler ARP model maintains the state of brake application. Any change in brake pipe pressure either up or down is directly translated to a brake cylinder pressure (BCP).

In one preferred and non-limiting embodiment, and when modeling the train braking system 26, and with respect to parameter adjustment used in the emergency curve, once a penalty application is made, several of the parameters are adjusted to values that are near the worst case value for that parameter. New braking curves are generated with these changed parameters, the remaining unchanged parameters, and the new speed values. If this new emergency braking curve impinges on the target, emergency braking is initiated subject to certain constraints. With continued reference to parameter adjustment used in the emergency curve, several "worst case" parameters are considered, including: (1) Worst Case Operative Brake Ratio (There is a minimum speed for emergency brake application, and in one embodiment, the default value is two mph. If the speed has already been reduced to two mph, the application of the emergency brake will likely be ineffective by the time it propagates through the length of the train. The sudden application of emergency braking at a low speed might also lead to poor train handling.); (2) Worst Case Operative Brake Ratio (Most trains would leave a terminal with 100% operative brakes. If the train is not braking as expected, it is possible that one or more brake valves have developed a mechanical problem that prevents it from operating. In one embodiment, the default for this parameter is 98%.); (3) Worst Case Freight Empty Car Net Braking Ratio (Without detailed knowledge of the as built design of a car, it is impossible to know what the net braking ratio of an empty car. Accordingly, and in one embodiment, this parameter is set to a conservative value of 0.206.); (4) Worst Case Freight Loaded Car Net Braking Ratio (While this parameter is controlled by rule for new and rebuilt cars, this change allows for less brake force to be predicted in the original predictions. In one embodiment, this parameter is set of a conservative value of 0.085.); (5) Worst Case Speed (As discussed, speed is an important in the braking calculation. If the speed is not accurate and timely, the braking distance prediction can vary over a wide range. This could occur if there were significant errors in GPS speed, wheel size calibration, or faster-than-expected acceleration between sampling intervals. While the on-board computer 12 determinations are designed to minimize all these effects, in one embodiment, the reported speed is incremented by 0.3 mph in the calculation of the emergency braking curve.); and (6) Worst Case Grade (Grade forces (both positive and negative) can be a another significant factor in the stopping distance calculation. The grade indicated in the track database is normally substantially accurate. The assumption that requires consideration is the baseline assumption in the brake algorithm or model that the train has a uniform mass. For certain trains (e.g., unit coal trains), this is a good assumption. However, for intermodal trains, the distribution of mass in the containers is not known. In one embodiment, and to account for possible error in grade and mass distribution, a negative 0.1 percent is added to the grade calculation over the length of the train.)

In one preferred and non-limiting embodiment, and with respect to force calculations, it is recognized that such force calculations combine the negative forces that retard progress of the train with positive forces that advance the progress of the train. The resultant force is used to determine the expected magnitude and direction of acceleration. In one preferred and non-limiting embodiment, the force calculations include the following parameter or considerations: (1) Grade (Grade force is positive if the grade is downhill and negative if going uphill.); (2) Curvature (Curvature force is always negative.); (3) Resistance (Resistance force is always negative. In one embodiment, and for organizational purposes, car and locomotive forces are calculated separately.); (4) Motor (Motor force is positive. A negative motor force indicates dynamic braking which is currently only used or estimated during the prediction curve portion of the braking algorithm.); and (5) Braking (The braking force is always negative.)

In one preferred and non-limiting embodiment, and with respect to the stopping distance calculation, all speed and distance curves (e.g., the curves illustrated in FIG. 19) are calculated by numerical integration, with updates once per second. As discussed, the equation F=ma is used for the numerical integration where (F) is the sum of all the forces discussed in previous sections, (m) is the mass of the train, and (a) is calculated based on certain constraints. In one preferred and non-limiting embodiment, these numerical integration calculations are computed for three different scenarios, namely: a predictor curve (X), a braking curve at end of prediction (Y), and a braking curve at the present location (Z).

In one preferred and non-limiting embodiment, the predictor curve (X) is integrated for the number of steps indicated in the warning time interval, and it assumes that current throttle or brake settings are maintained for the entire curve calculation. This curve (X) includes dynamic brake forces, if present. It is possible that under current brake and throttle settings the train is brought to a stop during the warning/predictor curve (X), and it is also possible that current settings could cause significant acceleration. The maximum speed that can be reached under this acceleration is based on the current applicable speed limits that would result in reactive over-speed enforcement. In any case, at the end of the predictor curve (X) numerical integration, the train is at some new location and new speed.

With respect to determining the braking at the end of the warning interval, this numerical integration begins where the predictor curve (X) stopped, and extrapolates where the train would come to a stop for a penalty brake application initiated at the end of the predictor curve (X), resulting in the predictive braking curve (Y). Brakes apply after the enforcement delay and are measured at the departure test, and the motor forces are slowly removed after the PCS delay measured at the departure test. In this embodiment, this integration does not include dynamic brake effects. At each step, the calculated acceleration is used to calculate a new speed. When this new speed reaches zero, the train is predicted to have come to a stop. In order to protect against a condition where the system does not appear to resolve to a stop, the integration may be limited to a 7-minute projection. If this algorithm or model predicts that the train cannot be stopped by a 7-minute brake application, a critical fault is created and a penalty brake application is immediately commanded. The sum of the distances integrated in the last two curves, plus a safety factor or offset, becomes the warning distance as indicated on the locomotive 10 display or interface.

The reactive braking curve (Z) is a determination as to where the train will stop if the brakes are applied immediately. This numerical integration is identical to that described in above in connection with determination of the predictive braking curve (Y), with the exception that it begins at the present time, as opposed to beginning at the end of the predictor curve (X). This is the commonly referred to braking distance, and this distance, plus a safety factor or offset, is also indicated on the locomotive 10 display or interface.

It is noted that if all the data discussed above were completely accurate and timely, then every stop would occur at the exact distance predicted. However, in reality, the source data has some inherent inaccuracies, resulting in variability in stopping distance. Accordingly, and as discussed above, the stopping distance calculations may be considered a mean stopping distance around which a distribution of actual stopping distances is expected to occur. Therefore, using the above-discussed design approach, the algorithm or model determines or calculates a prediction of the shape and distribution of the variable stopping distances in order to determine an appropriate safety factor to be added to the mean stopping distance.

As discussed, and in one preferred and non-limiting embodiment, an object of this determination or calculation is that the train exhibits or has a 99.5% probability of stopping short of a given stop target with 99% confidence. In another embodiment, a corresponding object is that actual stops must not be excessively short of the target. The probability of stopping excessively short (e.g., greater than 500 feet for speeds less than 30 mph, greater than 1,200 feet for speeds greater than 30 mph) is a factor requiring consideration. Regardless, and in one embodiment, the 99.5% goal of stopping short is a controlling parameter in the analysis leading to the design of a braking algorithm or model.

As discussed above, and in one preferred and non-limiting embodiment, in order to calculate the 99.5% probability with 99% confidence, there must be a very large sample (or trials) of stops, which occurs with a design computer simulation. As discussed, and in one preferred and non-limiting embodiment, the technique used in these simulations is a Monte Carlo analysis. For every significant variable in the braking equation, the values for that variable are varied over a range according to some distribution based on practical knowledge of railroad operation. Once a set of values is defined for a scenario, a trial is run with that set of values. This must be done over a range of train types, train speeds, grades, and with various consists. Larger numbers of simulations yield greater confidence in the resultant distribution.

In one preferred and non-limiting embodiment, these variables are based upon different variable, such as: (1) Grade (−2.8% to 2.8% in 0.5% increments—maximum mountain grade in the United States); (2) Freight Car Net Braking Ratio (loaded and empty—AAR guidelines); (3) Speed (0 mph to 79 mph in 10 mph increments—timetables and rules); (4) Locomotive Weight (not varied in this analysis—vender specifications); and Brake Application Time (varied per equation—e.g., 100 car brake rack test and field tests). In one exemplary embodiment, the trial train includes: 100 loaded aluminum coal cars, four AC44 locomotives (two on lead and two rear end helper with DP enabled), a track with a −1.0% grade, and a train speed of 30 mph.

In this example, the empty car weight may be 24.5 tons, as specified by the builder, with a capacity of 118 tons of coal. This would constitute a total trailing weight of (100*(118+ 24.5)) or 14,250 tons. In one trial of the simulation, the trailing tonnage may randomly be selected from the range of 14,107.5 tons to 14,392.5 tons (±1%). The grade may be randomly varied between −1.1% and −0.9%, and the initial speed may be selected in the range of 29.9 mph to 30.1 mph. While it is expected that the train left its initial terminal with 100% operative brakes, a conservative assumption may be used where one or more brake valves may not operate in any given braking application. In this case, the distribution is one-sided, and the percentage of operating brakes may randomly be selected in the range of 98% to 100% of the available brakes. The other parameters in the complete equation are varied in a similar manner. It is statistically highly improbable that a single simulation would yield the worst case long-stop or best case short-stop. But after many trials using the Monte Carlo analysis, the shape of the distribution and the standard statistical measures of mean and standard deviation for that set of trials is available. This process of many (e.g., about 1,000) trials is repeated for a wide range of scenarios that cover different train lengths, train types, weight, grade, and speed.

Next, and in this embodiment, the data from the simulations are copied to a spreadsheet, and the statistical mean and standard deviation for each scenario is calculated. From this data, a standard deviation for each scenario is calculated to encompass 99.5% of all data points. The result of this calculation is an appropriate safety factor for the specific scenario that results in a 99.5% probability that all enforcements for that scenario will stop short of the target. Using this approach, an appropriate safety factor is determined for each scenario and the next step is to apply these safety factors to the real-world operating conditions. As discussed above, and in one preferred and non-limiting embodiment, the variables with the greatest magnitude of impact on the safety factors are grade, weight, and speed. Accordingly, and as discussed, a formula is created based on these simulations for use in the on-board implementation, and this formula generates a safety factor for a train as a function of these three key parameters. The use of this formula allows for a continuous determination of the safety factor even though the Monte Carlo analysis yielded safety factors only at discrete points. With reference to the above exemplary embodiment, it may be that: instead of 100 cars, there are actually 111; instead of a −1.0% grade, the grade is actually −1.17%; and instead of 30 mph, the actual measured speed with a calibrated wheel tachometer is 28.7 mph. Although the safety factor for the Monte Carlo case would be close to the actual case, the variation would not fall within the statistical requirements of 99.5% probability of stopping short of the target.

In order to develop the equation or formula for determining the safety factor by the on-board model, and in the design or simulation process, the results of the trials are used to create a table with a line for each scenario (trial). One exemplary portion of a set of data for a scenario is illustrated in Table 10. It should be noted that this table will actually have several hundred lines documenting the various speed, grade, and train weight combinations. In one preferred and non-limiting embodiment, and rom this table, an equation or formula is developed with three independent variables (i.e., speed, grade, and weight) that produce the correct statistical safety factor (or offset). This same process may be used to develop a formula that takes in to account additional parameters and variables, which can be provided to or measured by the on-board computer 12. For example, and in order to further enhance the accuracy of the resulting equation or formula for determining the safety factor, and based upon the simulations, further parameters can be identified and used as variables.

TABLE 10

| Grade (%) | Speed (mph) | Train Weight (tons) | Statistical Safety Factor (ft) |
|---|---|---|---|
| −1.0 | 10 | 15078 | 250 |
| −0.5 | 10 | 15078 | 150 |
| ... | ... | ... | ... |
| 1.0 | 10 | 15078 | 50 |

It is recognized that an existing third-party software program that can fit arbitrary data can be used to generate the desired equation or formula. Several equations or formulae may be developed that have an appropriate fit with the data when plotted, and the best fit may then be identified and selected. The data may then be used to optimize to this equation or formula to minimize residuals (i.e., the difference between the calculated number from the equation and the number that was originally supplied to the curve fit program). For example, in the first line of Table 10, the input number is 250 feet. The selected or determined equation or formula may produce an answer of 257 feet, and the 7 foot difference represents the residual.

As discussed, and in one preferred and non-limiting embodiment, the function used to curve fit the Monte Carlo data (from the simulation) as a function of grade, speed, and total train weight may be effective for large samples of data of the same general class. However, when all the data is combined the residuals may become larger than acceptable for some classes of trains. As such, and in one preferred and non-limiting embodiment, the data is separated into several classes, where the residuals returned to acceptable values. This results in using the same equation or formula, but a different set of constants may be used for the following classes of train: (1) Freight Consists (This class of trains is characterized by head-end only locomotive consists, and lighter trains of less than 12,000 total tons.); (2) Locomotive-Only Consists/Short Trains (This class of trains is characterized by having from 0 to 15 cars.); (3) Distributed Power Consists (This class of train consists of running locomotives at the head-end and at least one other place in the train consist. In distributed power consists the brakes can be applied from multiple points within the train with the brake application time, and the build-up of brake forces can occur in significantly different patterns.); and (4) Passenger Consists (This class of train is identified by the train type in the train consist message, and features shorter consists and constant charging, which requires a different set of constants for the equation or formula.)

In another preferred and non-limiting embodiment, and with respect to validation of the process and model, including the determined equation or formula for calculating the safety factor, validation testing may occur on an actual track from actual railroad subdivisions; however, it is recognized that actual track seldom maintains a controlled grade or curvature for a significant length, such that the effect of changing that single variable in the equation can account for it. In order to test with constant grades and curvature, and in one embodiment, approximately 70 "subdivisions" of track have been created with constant grade and curvature profiles.

In another preferred and non-limiting embodiment, locomotive, wayside, and office simulators may be used to allow the on-board computer 12 be tested in a laboratory environment. These simulators provide the ability to create repeatable scenarios with specific locomotive, wayside, or office settings that would be encountered with an actual train. This level of testing may be controlled by a test script that can automatically execute a series of braking tests for evaluation of changes.

In a further preferred and non-limiting embodiment, and as discussed above, the on-board braking prediction model runs in real-time at a 1 Hz rate. If the actual on-board code is used to perform the Monte Carlo simulations, it may take a long time to record sufficient results. For example if there were 100 cases, and 1,000 Monte Carlo trials per case, with an average stop taking about 2 minutes, it would take about 200,000 minutes or 0.38 years to run on a single computer. In order to perform Monte Carlo simulations at a faster rate, the real-time 1 Hz constraint may be removed from the algorithm, and the braking and prediction algorithm can execute quickly in the host hardware.

In another preferred and non-limiting embodiment, the validation process includes connection of the on-board computer algorithm or model in a virtual machine with the train operations and energy simulator (TOES) model. The TOES model provides actual feedback of braking performance, and in this environment, consist data supplied to the on-board computer 12 is constant, and the braking response in the TOES model is varied in the Monte Carlo manner. In the same manner, as described previously for the design of the safety factor, the TOES model may be used in connection with many trials of an expected actual train responding to a braking event. In this embodiment, the TOES model sends to the braking model the speed, the location, and the brake pipe pressures, and the braking model responds with commands to apply the brakes.

It is recognized that one of the important parameters in the braking algorithm or model is the estimation of freight car braking force. The freight car fleet is often large, and includes new and rebuilt cars. The American Association of Railroads (AAR) publishes guidelines for net braking ratio (NBR), based on car type and year of construction or rebuild. If a railroad has access to data (from an existing database of rail equipment specification as built, modified, and repaired) for a significant population of the cars used on their property, then a total braking force can be calculated from this data. If the braking force is unknown, the braking algorithm or model will use a braking force calculates by the on-board computer 12 that assumes a default NBR. The TOES modeling in this effort may include several default train types as summarized below. The TOES simulations may be executed with a braking force number entered in the consist message to the on-board computer 12 based on the NBR documented below. Such TOES simulations may be executed with a default internal braking algorithm or model for calculating the brake force. In addition, it is note that as the trains became longer, the simulations are executed with various combinations of mid and rear end distributed power configurations.

In one preferred and non-limiting embodiment, the net braking ratio used for unit trains is as follows: Unit Coal (Western Aluminum), NBR=11.1%; Unit Coal (Eastern Steel), NBR=9.0%; Unit Tank, NBR=9.1%; Unit Refrigerated Boxcar, NBR=10.2%; Unit Multilevel (Autorack), NBR=10.2%; and Unit Covered Hopper (Grain), NBR=9.8%. In another preferred and non-limiting embodiment, the net braking ratio used for intermodal trains is as follows: Single Platform, NBR=11.3%; Three Platform, NBR=11.4%; and Five Platform, NBR=11.2%. In a further preferred and non-limiting embodiment, the net braking ratio used for a manifest car or train (which may include a variety of car types) is as follows: Covered Hopper, NBR=9.2%; Equipped Hopper, NBR=11.1%; Refrigerated Box, NBR=10.2%; Tank Car, NBR=8.8%; Equipped Box, NBR=9.9%; Unequipped Box, NBR=9.0%; Equipped Gondola, NBR=8.8%; Flat, NBR=9.7%; Unequipped Hopper, NBR=8.5%; Conventional Hopper, NBR=10.3%; Vehicular Flat, NBR=10.2%; Gondola, NBR=10.9%; and Equipped Gondola, NBR=9.3%.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A computer-implemented method for determining a safety factor formula for use in a braking model of at least one train, the method comprising:
    (a) for a specified scenario having specified train modeling constants, providing the specified train modeling constants and a plurality of train data inputs into a braking model programmed to determine a predicted braking distance;
    (b) for a plurality of subsequent specified scenarios having the same specified train modeling constants, modifying a plurality of the train data inputs, and providing the specified train modeling constants and the modified train inputs into the braking model to determine a plurality of subsequent predicted braking distances;
    (c) determine at least one safety factor based at least in part on the distribution of the predicted braking distance and the subsequent predicted braking distances for the specified scenarios;
    (d) repeating steps (a)-(c) for a plurality of different specified scenarios;
    (e) based at least partially on steps (a)-(d), determining a formula for, during train operation, calculating a safety factor based at least partially on (i) at least one operating train constant, and (ii) train speed, track grade, and train weight;
    (f) providing the formula to at least one on-board computer of at least one train for use in the determination, during train operation, of at least one safety factor based at least partially on (i) at least one operating train constant, and (ii) train speed, track grade, and train weight, to cause the at least one on-board computer of the at least one train to activate or cause the activation of an emergency braking system based at least partially on the at least one safety factor and a specified target location.

2. The computer-implemented method of claim 1, wherein the at least one operating train constant is at least one of the following: train type, train total tonnage, number of railcars, position of locomotive, availability of emergency braking, or any combination thereof.

3. The computer-implemented method of claim 1, wherein at least one of the specified train modeling constants is a parameter representing the use of emergency braking.

4. A braking system for a train having at least one locomotive with at least one on-board computer and, optionally, at least one railcar, wherein the on-board computer is programmed to:
    receive a formula for calculating, during train operation, a safety factor based at least partially on (i) at least one operating train constant, and (ii) train speed, track grade, and train weight;
    receive or determine the at least one operating train constant;
    using the formula, calculate a safety factor based at least partially on (i) the at least one operating train constant, and (ii) train speed, track grade, and train weight;
    receive or determine a plurality of operational train data inputs;
    determine at least one predicted braking distance using an on-board braking model and based at least partially on the plurality of operational train data inputs and the calculated safety factor; and
    activate or cause the activation of an emergency braking system based at least partially on the at least one predicted braking distance and a specified target location.

5. The system of claim 4, wherein the operating train constants are at least one of the following: train type, train total tonnage, number of railcars, position of locomotive, availability of emergency braking, or any combination thereof.

6. The system of claim 4, wherein the on-board computer is further programmed to:
   generate at least one braking profile or curve based at least partially on the at least one predicted braking distance; and
   display the at least one predicted braking distance on at least one display of the on-board computer.

7. The braking system of claim 4, wherein use of an emergency braking system is selectable between at least one of the following conditions: (i) always use emergency braking for every braking event; (ii) only use emergency braking for a specified condition; (iii) only use emergency braking for an emergency braking event.

8. The system of claim 4, wherein the on-board computer is further programmed to:
   initiate a penalty brake application;
   generate at least one emergency braking profile or curve based at least partially on the at least one predicted braking distance to a specified target location;
   update the at least one emergency braking profile with a plurality of operational train data inputs, thereby providing at least one updated emergency braking profile or curve; and
   based upon at least one train condition, activate or cause the activation of an emergency braking system when the updated emergency braking profile or curve intersects the specified target location.

9. A braking system for a train having at least one locomotive with at least one on computer and, optionally, at least one railcar, wherein the on-board computer is programmed to:
   receive a database populated with a plurality of safety factors for a plurality of train speeds, track grades, and train weights;
   receive or determine at least one operating train constant;
   using the database, determine or select a safety factor based at least partially on (i) at least one operating train constant, and (ii) train speed, track grade, and train weight;
   receive or determine a plurality of operational train data inputs;
   determine at least one predicted braking distance using an on-board braking model and based at least partially on the plurality of operational train data inputs and the determined safety factor; and
   activate or cause the activation of an emergency braking system based at least partially on the at least one predicted braking distance and a specified target location.

10. The system of claim 9, wherein the at least one operating train constant is at least one of the following: train type, train total tonnage, number of railcars, position of locomotive, availability of emergency braking, or any combination thereof.

11. The system of claim 9, wherein the on-board computer is further programmed to:
    generate at least one braking profile or curve based at least partially on the at least one predicted braking distance; and
    display the at least one predicted braking distance on at least one display of the on-board computer.

12. The braking system of claim 9, wherein the use of the emergency braking system is selectable between at least one of the following conditions: (i) always use emergency braking for every braking event; (ii) only use emergency braking for a specified condition; (iii) only use emergency braking for an emergency braking event.

13. The system of claim 9, wherein the on-board computer is further programmed to:
    initiate a penalty brake application;
    generate at least one emergency braking profile or curve based at least partially on the at least one predicted braking distance to a specified target location;
    update the at least one emergency braking profile or curve with a plurality of operational train data inputs, thereby providing at least one updated emergency braking profile or curve; and
    activate an emergency braking system when the updated emergency braking profile or curve intersects the specified target location.

14. A braking system for a train having at least one locomotive with at least one on-board computer and, optionally, at least one railcar, wherein the on-board computer is programmed to:
    determine at least one predicted braking distance using an on-board braking model;
    initiate a penalty brake application;
    generate at least one emergency braking profile or curve based at least partially on the at least one predicted braking distance to a specified target location;
    update the at least one emergency braking profile or curve with a plurality of operational train data inputs, thereby providing at least one updated emergency braking profile or curve; and
    based upon at least one train condition, activate or cause the activation of an emergency braking system when the updated emergency braking profile or curve intersects the specified target location.

15. The braking system of claim 14, wherein the plurality of parameters comprises at least one of the following: operative brake ratio, freight empty car net braking ratio, freight loaded car net braking ratio, speed, grade, or any combination thereof.

16. A computer-implemented method for determining a plurality of safety factors for use in a braking model of at least one train, the method comprising:
    (a) for a specified scenario having specified train modeling constants, providing the specified train modeling constants and a plurality of train data inputs into a braking model programmed to determine a predicted braking distance;
    (b) for a plurality of subsequent specified scenarios having the same specified train modeling constants, modifying a plurality of the train data inputs, and providing the specified train modeling constants and the modified train inputs into the braking model to determine a plurality of subsequent predicted braking distances;
    (c) determine at least one safety factor based at least in part on the distribution of the predicted braking distance and the subsequent predicted braking distances for the specified scenarios;
    (d) repeating steps (a)-(c) for a plurality of different specified scenarios;
    (e) based at least partially on steps (a)-(d), generating a database populated with a plurality of safety factors selectable based at least partially on (i) at least one operating train constant, and (ii) train speed, track grade, and train weight; and
    (f) providing the database to at least one on-board computer of at least one train for use in the selection, during train operation, of at least one safety factor based at least partially on (i) at least one operating train constant, and (ii) train speed, track grade, and train weight, to cause the at least one on-board computer of the at least one train to activate or cause the activation of an emergency braking system based at least partially on the at least one safety factor and a specified target location.

17. The computer-implemented method of claim 16, wherein the at least one operating train constant is at least one of the following: train type, train total tonnage, number of railcars, position of locomotive, availability of emergency braking, or any combination thereof.

18. The computer-implemented method of claim 16, wherein at least one of the specified train modeling constants is a parameter representing the use of emergency braking.

* * * * *